United States Patent [19]
Baker

[11] Patent Number: 5,962,989
[45] Date of Patent: Oct. 5, 1999

[54] ENERGY MANAGEMENT CONTROL SYSTEM

[75] Inventor: James Allan Baker, Edmonton, Canada

[73] Assignee: Negawatt Technologies Inc., Alberta, Canada

[21] Appl. No.: 08/950,506

[22] Filed: Sep. 16, 1997

Related U.S. Application Data

[63] Continuation of application No. 08/716,611, Sep. 23, 1996, Pat. No. 5,668,446, which is a continuation of application No. 08/373,156, Jan. 17, 1995, abandoned.

[51] Int. Cl.[6] .................................................. G05F 1/00
[52] U.S. Cl. ..................... 315/294; 315/295; 315/308; 315/361; 364/492
[58] Field of Search .................................... 315/294, 295, 315/308, 361, 159, 360, 291, 307, 158, 219, 312; 364/492–494, 550

[56] References Cited

U.S. PATENT DOCUMENTS

| | | | |
|---|---|---|---|
| 3,936,696 | 2/1976 | Gray | 315/210 |
| 4,127,796 | 11/1978 | Henderson | 315/395 |
| 4,139,735 | 2/1979 | Dorfman et al. | 179/2 |
| 4,210,846 | 7/1980 | Capewell et al. | 315/121 |
| 4,213,182 | 7/1980 | Eichelberger et al. | 364/493 |
| 4,251,752 | 2/1981 | Stolz | 315/206 |
| 4,358,716 | 11/1982 | Cordes et al. | 315/306 |
| 4,388,567 | 6/1983 | Yamazaki et al. | 315/291 |
| 4,461,977 | 7/1984 | Pierpoint et al. | 315/159 |
| 4,464,606 | 8/1984 | Kane | 315/158 |
| 4,523,128 | 6/1985 | Stamm et al. | 315/291 |
| 4,523,131 | 6/1985 | Zansky | 315/307 |
| 4,686,427 | 8/1987 | Burke | 315/219 |
| 4,697,122 | 9/1987 | Hoffer | 315/158 |
| 4,700,113 | 10/1987 | Stupp et al. | 315/224 |

(List continued on next page.)

FOREIGN PATENT DOCUMENTS

| | | | |
|---|---|---|---|
| 804710 | 1/1969 | Canada | 315/10 |
| 834880 | 2/1970 | Canada | 315/26 |
| 1173979 | 9/1984 | Canada | 355/29 |
| 1174771 | 9/1984 | Canada | 355/51 |
| 1179402 | 12/1984 | Canada | 315/37 |
| 1184593 | 3/1985 | Canada | 315/37 |
| 1254610 | 5/1989 | Canada | 315/44 |
| 0447136 A2 | 3/1991 | European Pat. Off. . | |
| 0471215 A1 | 7/1991 | European Pat. Off. . | |

OTHER PUBLICATIONS

Elektronik, vol. 41, No. 26, dated Dec. 22, 1992, pp. 26–30, XP000327405, S. Luger et al., "Beleuchtung Wird Busfaehig".

Patent Abstracts of Japan, vol. 5, No. 109 (E–65>781!, dated May 2, 1981 & JP,A,54 125663 (Toshiba) Sep. 28, 1979.

*Primary Examiner*—Haissa Philogene
*Attorney, Agent, or Firm*—Davis and Bujold

[57] ABSTRACT

An energy saving lighting control system for operating fluorescent light fixtures is provided with means for controlling the light level according to the light required for the task being done in the area. Ambient light available from sources outside of the controlled area such as daylight can be harvested to reduce the amount of artificial lighting required. A method of providing sensor inputs to detect occupancy in the controlled area provides control signals to the lighting control system which are used to reduce the light level or turn light fixtures off at times when the area is not occupied. A method of providing a central control of the operation of the lighting system can provide time-of-day scheduling, can provide minimum and maximum lighting levels, and can provide calibration and set-points for response times to various sensor inputs. In order to minimize the installation cost of the lighting control system, the system is provided with components that can be controlled using signals carried along the power conductors that provide primary operative power to the lighting fixtures. Special circuitry in the ballasts for fluorescent lamps provides a starting sequence and operating conditions that maximize the life of the lamps which therefore minimizes maintenance costs.

12 Claims, 19 Drawing Sheets

U.S. PATENT DOCUMENTS

| | | | |
|---|---|---|---|
| 4,704,563 | 11/1987 | Hussey | 315/307 |
| 4,716,343 | 12/1987 | Lindquist | 315/307 |
| 4,902,938 | 2/1990 | Lindquist | 315/307 |
| 5,030,887 | 7/1991 | Guisinger | 315/158 |
| 5,066,896 | 11/1991 | Bertenshaw et al. | 315/294 |
| 5,084,653 | 1/1992 | Nilssen | 315/219 |
| 5,107,184 | 4/1992 | Hu et al. | 315/291 |
| 5,128,594 | 7/1992 | Watanabe et al. | 315/294 |
| 5,172,034 | 12/1992 | Brinkerhoff | 315/307 |
| 5,179,326 | 1/1993 | Nilssen | 315/106 |
| 5,204,587 | 4/1993 | Mortimer et al. | 315/308 |
| 5,245,253 | 9/1993 | Quazi | 315/224 |
| 5,315,214 | 5/1994 | Lesea | 315/209 |
| 5,334,915 | 8/1994 | Ohsaki et al. | 315/307 |
| 5,352,957 | 10/1994 | Werner | 315/291 |
| 5,355,055 | 10/1994 | Tary | 315/209 |
| 5,357,170 | 10/1994 | Luchaco et al. | 315/159 |
| 5,363,020 | 11/1994 | Chen et al. | 315/209 R |
| 5,455,487 | 10/1995 | Mix et al. | 315/307 |
| 5,621,662 | 4/1997 | Humphries et al. | 364/450 |
| 5,668,446 | 9/1997 | Baker | 315/294 |

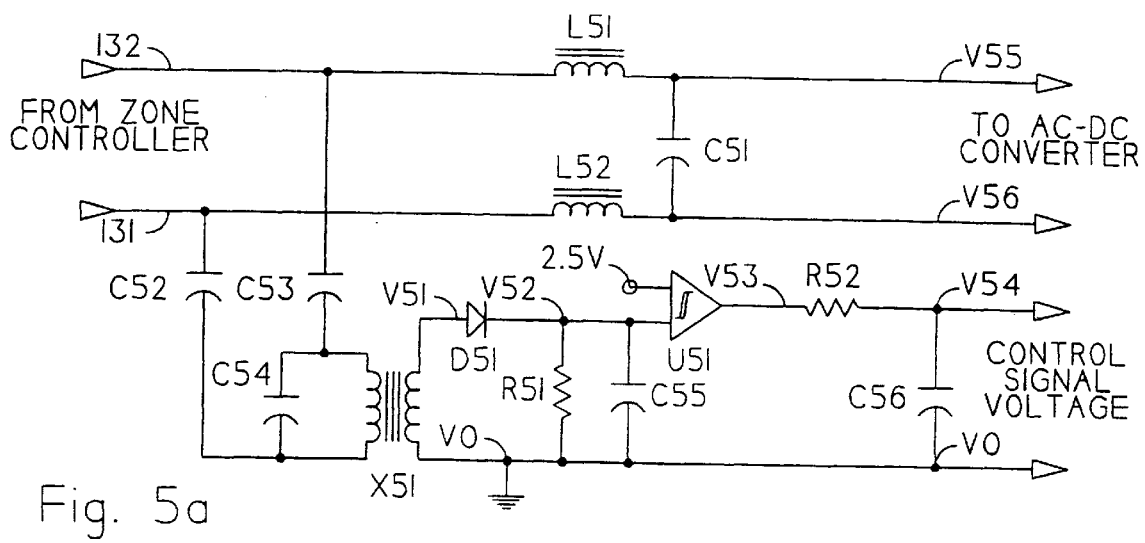
Fig. 5a
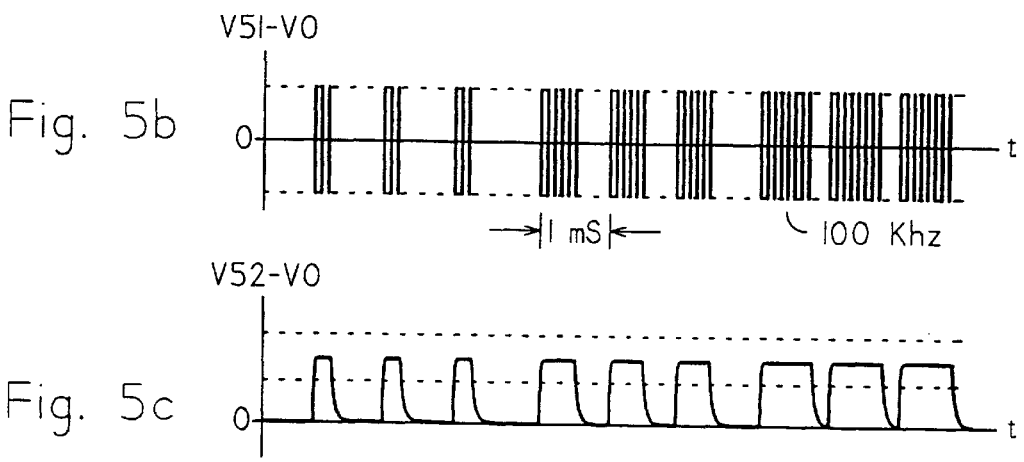
Fig. 5b
Fig. 5c
Fig. 5d
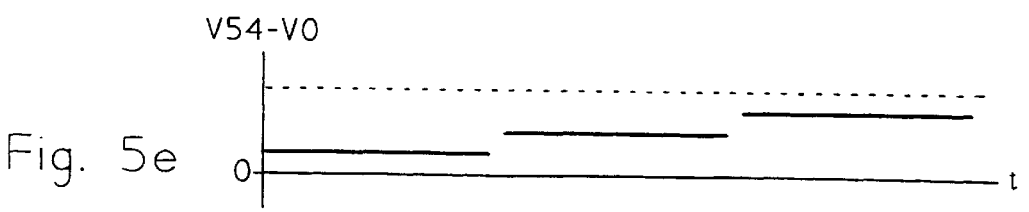
Fig. 5e

120 VOLT DIMMABLE CONTROLLABLE ELECTRONIC BALLAST

Fig. 21b PREFERRED

ENERGY MANAGEMENT CONTROL SYSTEM

CROSS-REFERENCE TO RELATED APPLICATIONS

This application is a continuation of application Ser. No. 08/716,611, filed Sep. 23, 1996, now U.S. Pat. No. 5,668,446, which is a continuation of Ser. No. 08/373,156, filed Jan. 17, 1995, now abandoned.

FIELD OF THE INVENTION

The present invention relates to improvements in a lighting control system and improvements in the components used to implement a fluorescent lamp lighting system.

BACKGROUND OF THE INVENTION

Controls for fluorescent lamp lighting systems have been devised and are now commercially available that will turn a light circuit ON and OFF depending on the signals provided by sensors such as motion detectors. Generally, the motion detector is a Passive Infra-Red (PIR) or Doppler technology device that provides a signal whenever motion is detected in the control zone. Motion created by occupants working in the area is not continuous and a detectable signal is not always available for a motion sensor. In an attempt to ensure that the lights are not turned off while the area is still occupied, a manually adjustable time delay or a preset time delay is provided within each sensor to keep the lighting circuit powered for the time delay before turning off the circuit. One disadvantage to circuit-switching occupancy sensors relates to the requirement to manually set a time delay in each sensor. In practice, most such sensors are set to the maximum delay time to minimize the annoyance of having the lights turned off when people are still occupying the area. Having the delay time set to the maximum value reduces the energy saving potential of this control method. A second disadvantage of circuit-switching occupancy sensors relates to having only an ON and an OFF state, the controlled area is either at full light or dark.

Controls for lighting systems have been devised and are now commercially available that will turn a light circuit on and off based on the availability of adequate light from an external source such as daylight. Generally, a photo sensor is provided to look at a window or at a representative area of the workspace to "see" if there is sufficient natural light available. If not, the artificial lighting circuit is switched ON. This type of control is usually provided with a manual adjustment in each sensor to set the activation light level. In order to have a stable control system, the additional light provided by the artificial lights controlled by the circuit must not cause the sensor to immediately turn the lights off again. One disadvantage to circuit-switching photo sensor controls relates to the requirement to manually set the operative light level in each sensor. A second disadvantage of circuit-switching photo sensors relates to having only an ON and an OFF state.

Dimming fluorescent ballasts are commercially available with a light level adjustment control (dimmer) so that the light level can be set manually. The purpose for such controls is primarily for aesthetic purposes rather than for energy saving. Relying on the occupant to set a lower light level to save energy is not a practical method for energy management. The primary purpose for manual dimming of fluorescent fixtures is for aesthetic lighting control and the cost of the ballast and dimmer components does not require economic justification from an energy saving perspective. This type of ballast is too expensive to be implemented in a large scale in a building for the purpose of saving the cost of energy.

Lighting control systems have been devised and are now commercially available that will adjust the light output of a special electronic ballast in response to a control signal provided by a light level controller. Such light level controllers are stand-alone controllers that are connected to a group of light fixtures using extra control wires. These controllers require manual adjustment of the setpoint light level at each sensor. Frequent adjustments of the light sensor is not practical if the light level should be changed daily in order to optimize energy consumption. The significant disadvantages of this type of controller is the high cost of the components because of their individual complexity, the high cost of installation because of their need for distributed control signal wiring to every ballast, the high cost of maintenance due to the requirement for individual calibration and adjustment at each sensor, and that the dimming controller cannot be interfaced to manual controls, timeclocks, or occupancy sensors.

Circuit-Switching controls such as those just described may cause the lighting circuits to be turned ON and OFF many times throughout the day. Most fluorescent lighting systems installed in North America still use magnetic ballasts to power the fluorescent lamps. Recently, fixed output instant start electronic ballasts are being used to replace traditional magnetic ballasts. Magnetic ballasts typically provide a cathode heating circuit in addition to the current to operate the plasma within the lamp. When this type of ballast is turned on, the plasma voltage is applied at the same time as the cathode heating power. It takes about one second before the lamp begins to operate properly. During this starting phase, damage is done to the lamp cathodes that shortens the lamp life. Repeated ON-OFF cycles with a magnetic ballast will dramatically reduce lamp life. Fixed output instant start electronic ballasts generally do not provide auxiliary cathode heat but the cathodes are heated by the plasma current. Again, damage is done to the lamp cathodes until they are indirectly heated to emission temperature. Repeated ON-OFF cycles with instant start ballasts drastically reduces lamp life. For circuit-switching controls applied to conventional magnetic ballast and instant start electronic ballast driven fluorescent lighting circuits, any benefit from the reduced cost of energy is offset by the need for increased lamp replacement.

Present technology dimmable electronic ballasts provide continuous lamp cathode heating which is maintained while the plasma current is reduced to maintain lamp life. There are also electronic ballasts now available that provide a soft start sequence for applying cathode heat before allowing plasma current to flow into the lamps. This soft starting sequence is described in the International Electrotechnical Commission (IEC) standard publication number 929. Many electronic ballasts that claim to have a soft start sequence for the lamps do not conform to the requirements of the IEC standard. For example, a dimming ballast described by Chen et al in U.S. Pat. No. 5,363,020 shows a so-called soft start sequence that does not achieve the intent of the IEC standard because damaging glow current will flow during the heating phase since the plasma voltage is also applied during that time.

Programmable lamp controllers such as described by Luchaco et al in U.S. Pat. No. 5,357,170 can accept input signals from occupancy sensors, light level sensors and manual dimming controls as well as signals from a central time clock, security system and the like. There are three disadvantages to the approach taken by Luchaco, one is that signals from a central time clock and security system require additional signal wiring in the building and the ballasts suggested for use require additional control wiring in addition to the standard power wiring. This additional wiring significantly adds to the cost of installation and increases the payback time. Also, the programmable lamp controllers have setpoints for minimum and maximum light levels and for photo sensor sensitivity that are manually set in the controller at the time of installation. The same disadvantages relating to adapting the control setpoints to optimize energy efficiency apply to this type of controller. The same cost disadvantages of using current technology dimmable electronic ballasts that were primarily designed for aesthetic dimming applications makes their use for the purpose of reducing energy costs not economically viable considering current energy costs.

A further disadvantage of present technology electronic ballasts are that they are fragile with respect to power line voltage transients. It is expensive to apply adequate surge protection in every ballast.

In view of the foregoing discussion, an object of the present invention is to overcome the noted disadvantages of current technology lighting control systems.

SUMMARY OF THE INVENTION

An object of the present invention is to provide a lighting control system to minimize energy consumption and therefore minimize the cost of energy required to operate a building. In order to have a short payback period to recover the additional cost of implementing an energy saving lighting control system, the cost of the components, the cost of installation and the cost of maintenance must be recovered through a reduction in the cost of energy. Another object of the present invention is to operate an electronic ballast more efficiently than a conventional magnetic ballast.

In one aspect of the invention, there is therefore provided a lighting control system for a building having several zones and a power source, with several zone controllers controlling and powering one or more fluorescent light fixtures. Each fluorescent light fixture includes a communication receiver for receiving control signals from the zone controller. Current carrier communication is preferably used for transmission of control signals.

Preferably, each fluorescent light fixture includes an electronic ballast with a power level adjustment circuit responsive to control signals appearing on the load side of the zone controller.

Efficient operation of the fixture may be obtained by: firstly by providing a high frequency current to the lamps which is known to provide more light output per watt than when operating at the 60 cycle mains frequency, secondly by providing a current waveshape to the lamps that has a low form factor which is known to provide more light output per watt than when operating with a high current form factor, thirdly by providing cathode heating power that is high enough to maintain lamp life but low enough to provide additional energy saving over operating the cathode heat continuously at levels required for starting the lamps, and fourthly, the circuitry employs active power factor correction and harmonic distortion control for the mains power current to minimize losses in the building power distribution system. The combination of these four energy saving measures results in a reduction in the cost of energy of at least 30% compared to conventional magnetic ballasts.

In another aspect of the invention, an electronic ballast has a soft start sequence for the lamps so as to maintain the life of the lamps and therefore minimize lighting system maintenance cost. This capability is required when the lighting control system demands many ON-OFF cycles as is the case when operating in response to an occupancy sensor (s).

Preferably, the electronic ballast provides a method and circuitry for controlling the power delivered to the lamps in response to a power control signal. The power level can be controlled from 100% to 25% or over a similar range. If a power level below 25% or some other given level is requested, then the lamps are turned OFF. The light output of the lamps is nearly linearly related to the power delivered to the lamps. If the lamps can be operated at a lower than maximum power level, then the cost of energy is proportionately reduced. When the control signal voltage exceeds a given level, the fluorescent light fixture may be turned off.

The electronic ballast also preferably includes a communication receiver that is able to detect control signals sent along the power wires from a zone controller to the ballast. This control signal is used to adjust the lighting power level being delivered to the lamps and also enables a soft start sequence if the lamps had been turned off. By implementing only a communication receiver in the ballasts, all ballasts are interchangeable and can be readily mass produced compared to implementing a two-way communication scheme. By utilizing Current Carrier Communication (CCC), additional control wiring is not required which minimizes the cost of installation, both for materials and for labor.

The zone controller preferably contains a port for connection of sensors such as occupancy sensors, light level sensors, and manual control switches that can sense conditions within the control zone. By mounting the zone controller at the first light fixture in the control zone, the distance from the zone controller to where the sensors are mounted to detect conditions within the zone is minimized. Minimized distances for wiring results in minimized installation cost.

The zone controller preferably provides a power source to operate active sensors such as occupancy sensors and light level sensors. The low voltage power source being integral with the zone controller means that auxiliary power adaptors are not required. The wiring from the zone controller to the sensors can be inexpensive low voltage control wiring which also minimises the cost of installation.

The zone controller preferably operates on the signals from the sensors and applies delay times, calibration values, and control setpoints that are appropriate for the zone and for the sensors. The sensors do not require such capability in themselves. Therefore the occupancy sensors, light level sensors, manual dimming input devices can be rudimentary and the cost of manufacturing suitable sensor is minimized.

The zone controller may provide transient protection for all of the ballasts connected on the load side of the zone controller. By passing the power to operate the ballasts through a zone controller, it provides a convenient place to implement additional power line surge protection and removes the cost of duplicating such protection in each ballast. The life expectancy of the ballasts can be greatly improved which results in lower cost of maintenance for the lighting system.

The zone controller may have a method of communicating with a central control computer using a CCC. This second current carrier communication means allows a central control computer to adjust setpoints in the zone controller. For example, setpoints include calibrate light level sensors, time delays for occupancy sensors, fade rates when changing light levels, and minimum and maximum light levels suitable for each zone. By having a central method of adjusting setpoints for sensors that are mounted in each control zone makes it possible to optimize the efficiency of the lighting control system without incurring substantial maintenance labor costs. Additional direct control over the zone lighting from the central computer can provide occupancy scheduling, over-rides to the zones in response to emergency situations and the like. Providing central control and central adjustment minimises the cost of energy and minimises maintenance costs. By using a CCC method of communication, there is no need for additional control wiring throughout the building from the central location which minimises installation cost.

The zone controller may have a two-way CCC means so that operating conditions within the zone can be monitored by a central control computer. Monitoring can provide valuable information to the building manager regarding maintenance scheduling by logging the effective operating hours for the lamps in each zone. Also, a central control computer can pass sensor information between zones to reduce the number of sensors required in a given building which reduces the installation cost further.

In a further aspect of the invention, there is provided a method of controlling fluorescent light fixtures distributed within distinct zones in a building, the method comprising the steps of connecting fluorescent light fixtures within each distinct zone to receive control signals from a zone controller associated with each distinct zone and supplying power and control signals to each fluorescent light fixture through the zone controller. Preferably, both power and control signals are supplied to each fluorescent light fixture along the same conductors.

The control signals provided to the fluorescent light fixture preferably control the power levels used by the fixture. A central computer may communicate with each zone controller and override signals from the sensors and provide direct control of the power level of the fixture. The central computer may also receive status information from the zone controllers.

The following detailed description of a preferred embodiment with reference to the accompanying drawings will make the advantages of these features better understood.

BRIEF DESCRIPTION OF THE DRAWINGS

There will now be described preferred embodiments of the invention, with reference to the drawings, by way of illustration, in which like numerals denote like elements and in which:

FIG. 5a shows circuitry and FIGS. 5b, 5c, 5d and 5e show waveforms of a CCC receiver means implemented in a DCEB.

FIGS. 21b and 21c show respectively preferred occupancy sensors and circuitry used to implement an occupancy sensor.

DETAILED DESCRIPTION OF PREFERRED EMBODIMENTS

Figure 1:
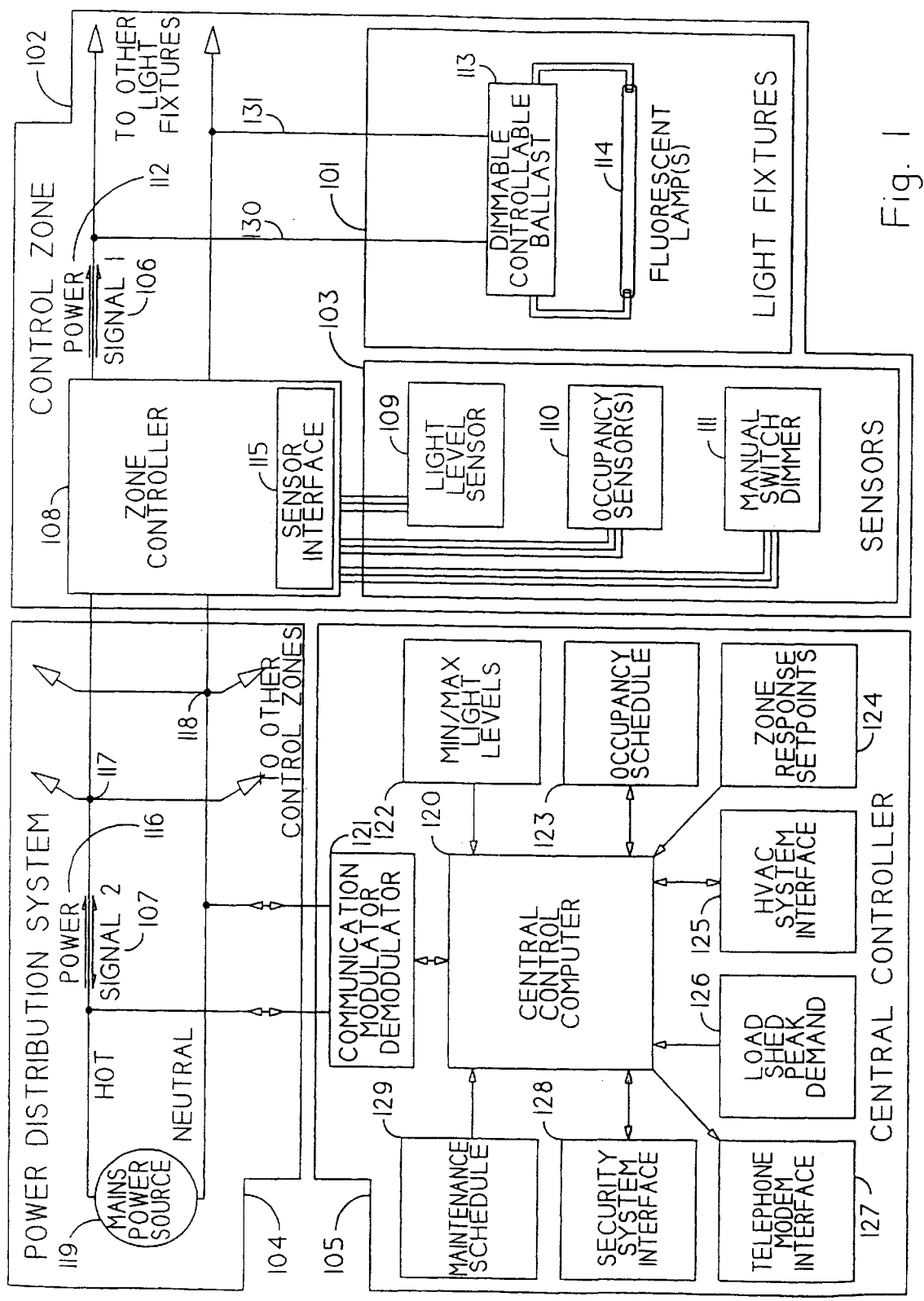
FIG. 1 shows a block diagram of a lighting control system that uses a zone control architecture with Dimmable Controllable Electronic Ballast(s) (DCEB), zone controller(s), central control computer, and two Current Carrier Communication (CCC) control means.

Referring now to the drawings, note that the first digit of three digit reference numbers and the first two digits of four digit reference numbers relate to the drawing number in which the element is first described. Further references to the same element in other drawings use the same reference number.

FIG. 1 is a block diagram of a lighting control system showing fluorescent light fixture(s) 101, zone controller 108 operatively connected to power source 119, sensors 103, mains power distribution system 104 containing the mains power source 119, central controller 105, a first communication means for control signals 106 appearing on the load side of zone controller to the fixtures, and a second communication means 107 for exchanging data between the central controller and the zone controller.

The central controller includes a central computer connected to communicate with each zone controller through the power leads of the power distribution system 104, and includes communication means 121 which sends control parameters to the zone controllers to affect operation of the zone controllers and receives signals from each zone controller corresponding to operating conditions within the zone associated with the zone controller.

Typically, a control zone 102 would be an office, a classroom, a hallway, or a group of light fixtures next to windows in a common office area. There could be from one to hundreds of distinct control zones in an office building or a school. Each control zone could have from one to tens of light fixtures 101, all responding to the same control signals. Each control zone will have a zone controller 108 that may be connected to sensors 103 such as light level sensors 109 which provide a signal according to the daylight available to the zone, occupancy sensor(s) 110 that respond to the presence of people in the zone, and manually operated switch inputs 111 that provide on-off and light level requests directly from occupants in the zone. The zone controller provides power 112 and a control signal 106 to the light fixtures operatively connected to the power conductors 130, 131 on the load side of the zone controller. Dimmable Controllable Electronic Ballasts (DCEB) 113 in the light fixtures provide a starting sequence and variable power to the fluorescent lamps 114 to provide the light required in the zone.

Figure 2:
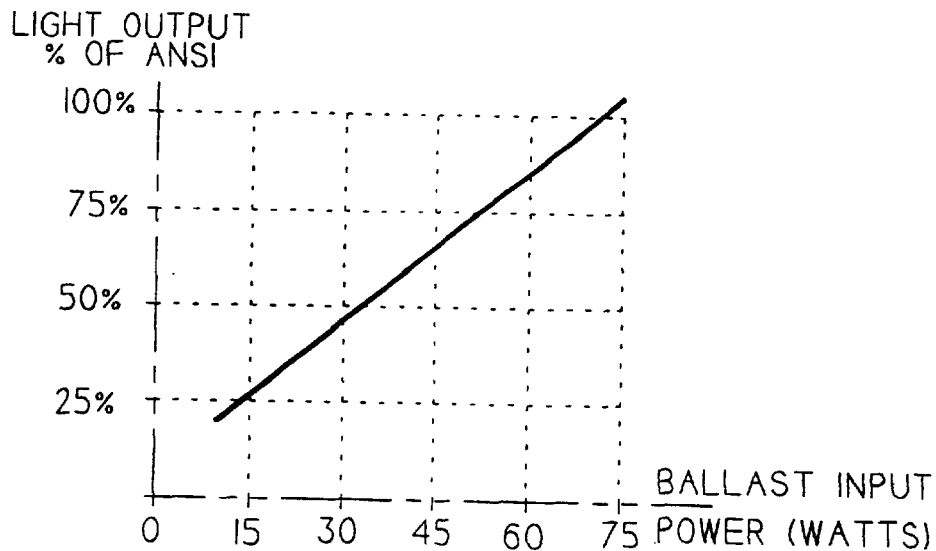
FIG. 2 shows a curve of light output vs power consumed by a fluorescent light fixture operated by a DCEB.

FIG. 2 shows the relationship between the light output from a light fixture 101 and the power used by the DCEB 113. It can be seen that by selecting a lower than maximum light output from the fixture, the power consumed by the fixture will reduce proportionately. It can also be seen that, to an adequate approximation, the light output of the fixture can be approximated by measuring the power consumed by the ballast. Prior art dimmable ballasts such as described by Guisinger in U.S. Pat. No. 5,030,887 show a method of measuring lamp current and then controlling the ballast circuit to regulate the lamp current. Prior art dimmable ballasts, such as described in U.S. Pat. No. 5,172,034 by Brinkerhoff, show a method of monitoring and controlling the lamp current and lamp voltage and performing an instantaneous power calculation to determine the lamp power. Other prior art ballasts attempts to determine the light being produced by a fixture by measuring the actual light produced with a light sensor. A distinguishing feature of the present invention is to use the method of measuring and controlling the input power to the ballast to achieve a dimming function for the ballast. The preferred embodiment uses the method of controlling the power consumed from the power line to control the light level of the fixture and is described in detail in connection with FIG. 6 to follow.

Figure 3:
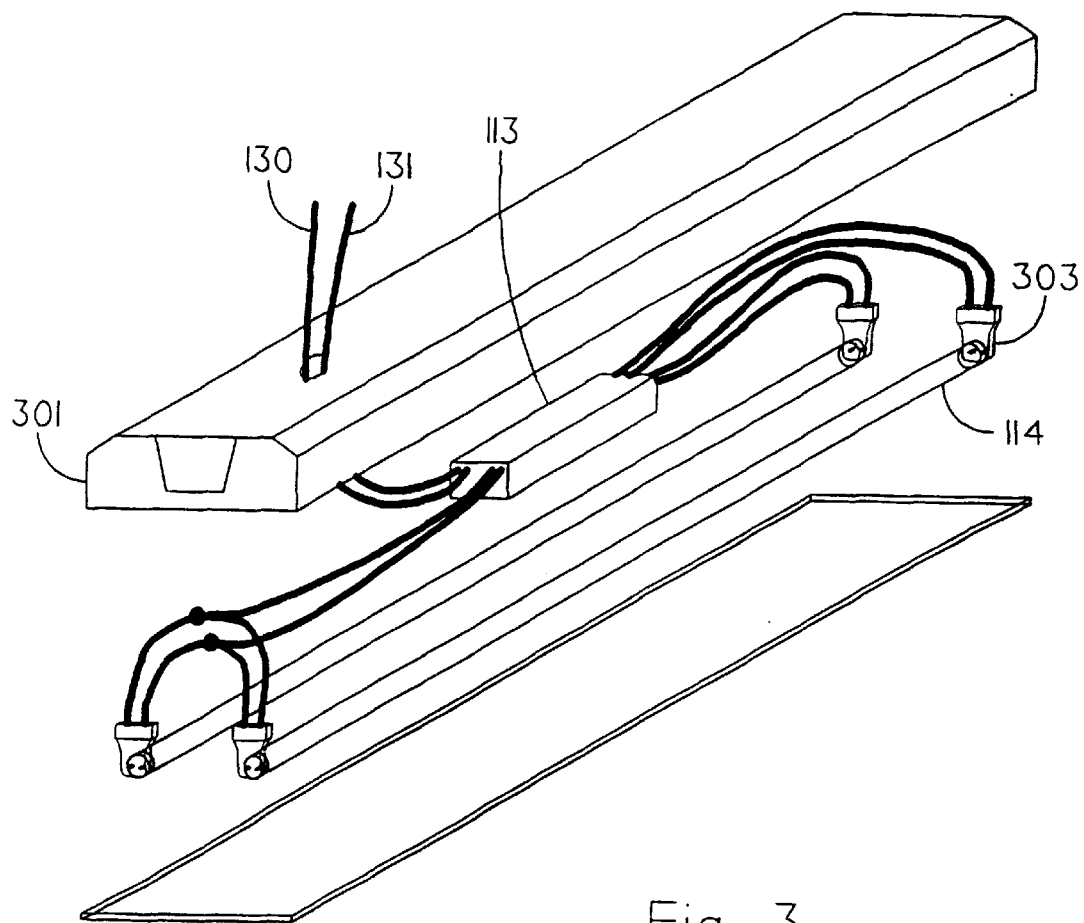
FIG. 3 shows the components comprising a light fixture that is one component of a lighting control system.

FIG. 3 is an exploded view showing the elements of a light fixture 101 including the fixture frame 301, standard bi-pin rapid start fluorescent lamp(s) 114 such as industry standard part number FO32T8, standard bi-pin lamp sockets 303, and a ballast 113 which provides power to operate the lamp(s), the power originating from the mains power distribution wires 130 and 131. It is noted that the fixture wiring method is the industry standard method for bi-pin rapid start fluorescent lamps. Prior art lighting control system such as described by Luchaco et al in U.S. Pat. No. 5,357,170 requires additional control signal wiring between a programmable lamp controller and the dimming ballasts. In the referred embodiment, there are no additional control or signal wires required.

Figure 4:
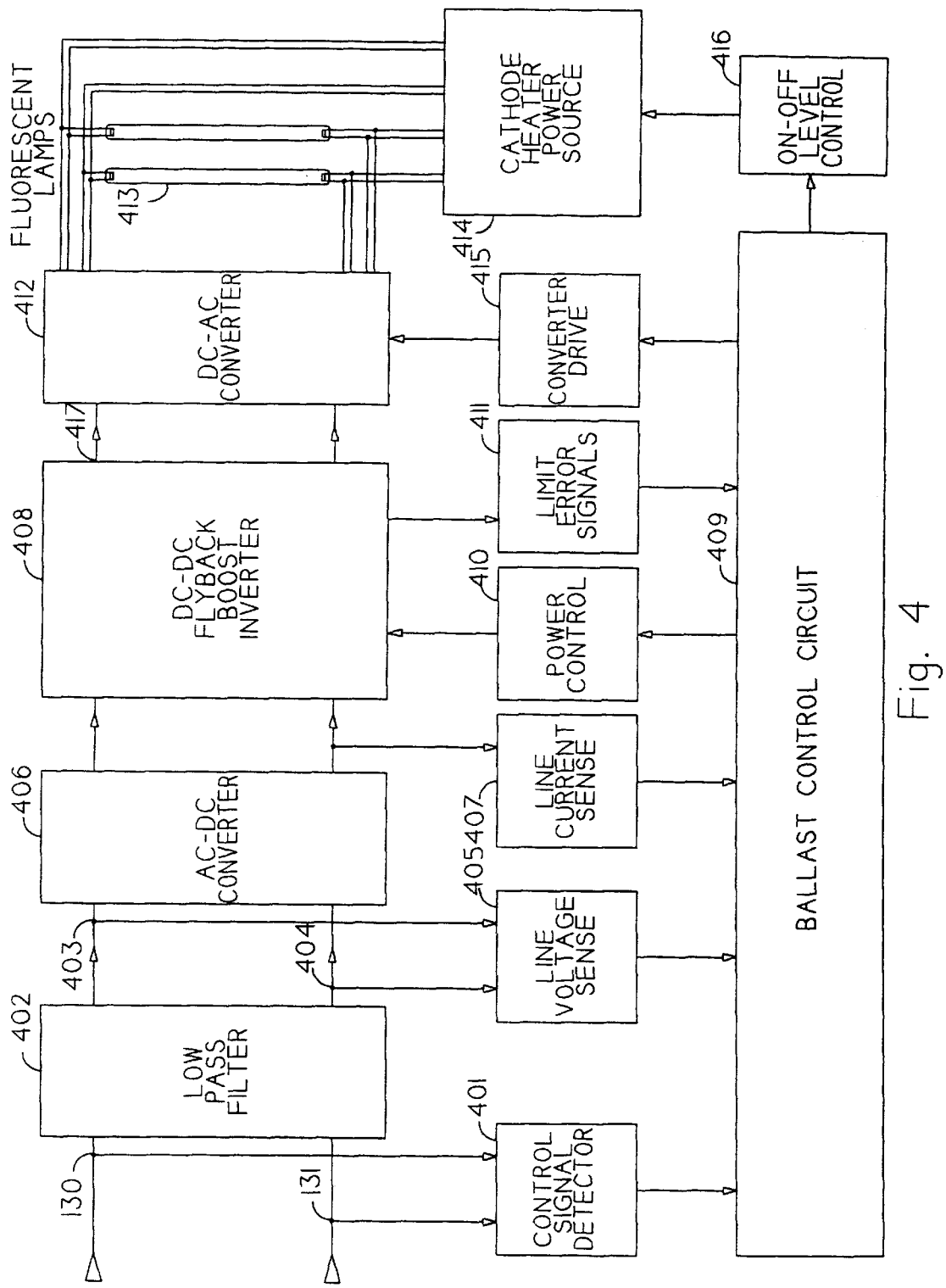
FIG. 4 shows a block diagram of the functional blocks of a DCEB that is suitable for use in a light fixture of a lighting control system.

FIG. 4 is a diagram showing the functional blocks of an electronic ballast suitable for use in this lighting control system. Starting from the connection to the power distribution wires 130 and 131, the ballast has a communication signal receiver 401 that is able to detect high frequency signals being sent along the mains power distribution wires. The operative power to run the lamps is then passed through a low pass filter 402 that blocks high frequency signals from continuing into the ballast circuitry and also prevents high frequency noise generated within the circuitry of the ballast from being coupled back onto the power distribution wires. The voltage of the mains power supplying the ballast measured between point 403 and point 404 is sampled using a line voltage sensing circuit 405 to provide a reference for ballast power consumption, line current power factor control, and line current harmonic distortion control. A bridge rectifier is used to convert the 50 or 60 cycle mains voltage to a DC voltage in an AC to DC converter circuit 406. The power line current is sampled with a line current sensing circuit 407 to provide power factor control, current harmonic distortion control and to determine the power being consumed by the ballast. A DC to DC flyback boost inverter 408 is preferred to draw power from the full wave rectified but unfiltered DC voltage from the AC-DC converter to provide a second DC voltage 417 that is higher than the peak voltage of the incoming line voltage. The ballast control circuit 409 provides the signals to the power control drive circuit 410 which operates the switching transistor in the DC-DC inverter. Limit error signals 411, such as a maximum voltage limit that may be encountered if the ballast is operated without lamps, is sent from the DC-DC inverter to the ballast control circuit. A final DC to AC converter 412 is used to supply the available power from the second DC voltage 417 to the fluorescent lamp(s) 413. The DC-AC converter can be turned on and off by a Converter Drive 415 control. The ballast control circuit provides a soft starting sequence for the lamps. An independent cathode heater power circuit 414 is used to provide heat to the cathodes of the fluorescent lamp(s). The cathode heater source can be turned on and off by the ballast control circuit 409 and can be controlled by a power level control 416 to provide a variable cathode heating power during the starting phase of the lamps and during the running phase of the lamps. Prior art such as U.S. Pat. No. 5,179,326 by Nilssen shows a separate cathode heating circuit that can be turned OFF after the ballast has operated for a short time. There is no means in Nilssen for variable control of the cathode heat to optimize lamp starting or to maintain cathode heat for operation at reduced light levels.

Referring again to FIG. 4, FIG. 5a shows the detail circuitry of the control signal detector 401 and the low pass filter 402. The power source from the zone controller 108 is applied on wires 130 and 131. A modulated high frequency control signal V51-V0 as shown in FIG. 5b is added to the mains frequency power from the zone controller. It is preferred that the modulated signal have a fundamental frequency of about 100 khz and be pulse code modulated with a variable duty cycle at a modulation frequency of at least 1 khz. Inductors L51, L52 and capacitor C51 are connected as a low pass filter 402 to supply the mains frequency power to the AC-DC converter 406 of the ballast 113. The low pass filter presents a high impedance to the high frequency control signal but allows the 50 hz or 60 hz mains frequency to pass. The preferred cut off frequency of the low pass filter is 1,000 hz.

Figure 8:
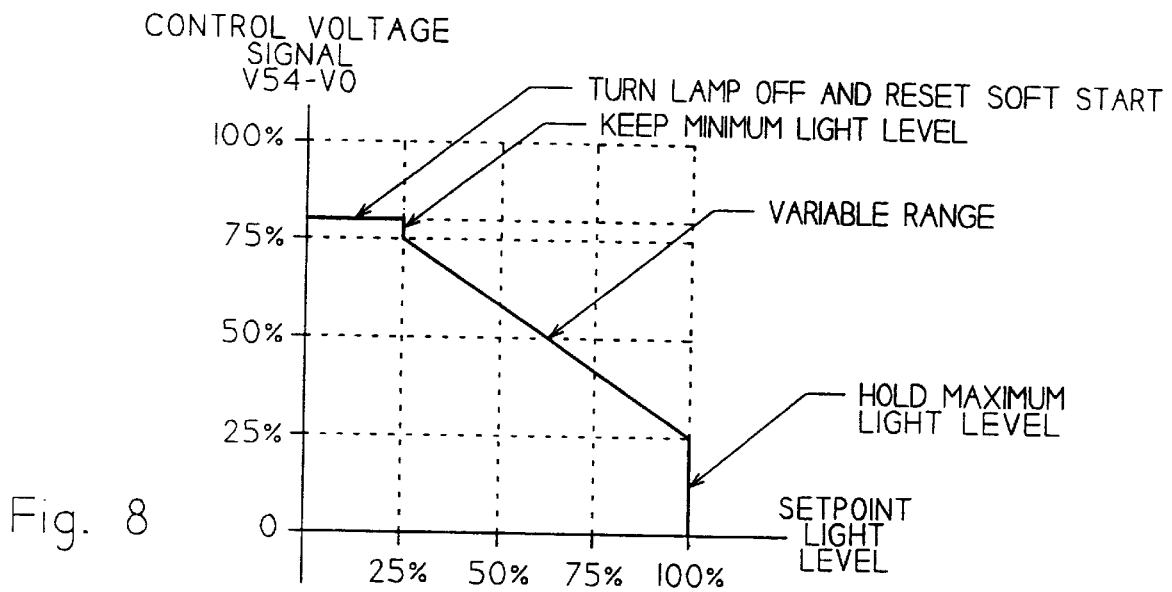
FIG. 8 shows a curve describing the phases of operation of the variable light output from a DCEB.

The high frequency control signal V51-V0 is passed through coupling capacitors C52 and C53 to the primary winding of a tuned transformer X51. The inductance of the primary winding of the transformer and the value of capacitor C54 is chosen to provide resonance at the fundamental carrier frequency of the high frequency control signal. The turns ratio of transformer X51 is such that the peak output voltage V51-V0 is about 5 volts. Diode D51 is used to detect the pulse coded signal amplitude and a second low pass filter comprising capacitor C55 and resistor R51 provide an amplitude envelope waveshape V52-V0 shown in FIG. 5c. The preferred time constant of the filter C55 and resistor R51 is 100 microseconds. Comparator U51 has a reference voltage of about 2.5 volts. and is used to detect the edges of the modulated waveform as shown in FIG. 5d. An output low pass filter comprising resistor R52 and capacitor C56 provides a direct current control signal V54-V0 as shown in FIG. 5e. The preferred cutoff frequency of the output low pass filter is 10 milliseconds. The ballast control circuit 409 of FIG. 4 uses the control signal V54-V0 to determine what light level is desired or if the ballast is to be turned off and the soft start sequence reset. FIG. 8 shows four phases of operation of the ballast circuit based on the duty cycle of the modulated control signal V54-V0 and is described in detail later.

Figure 6A:
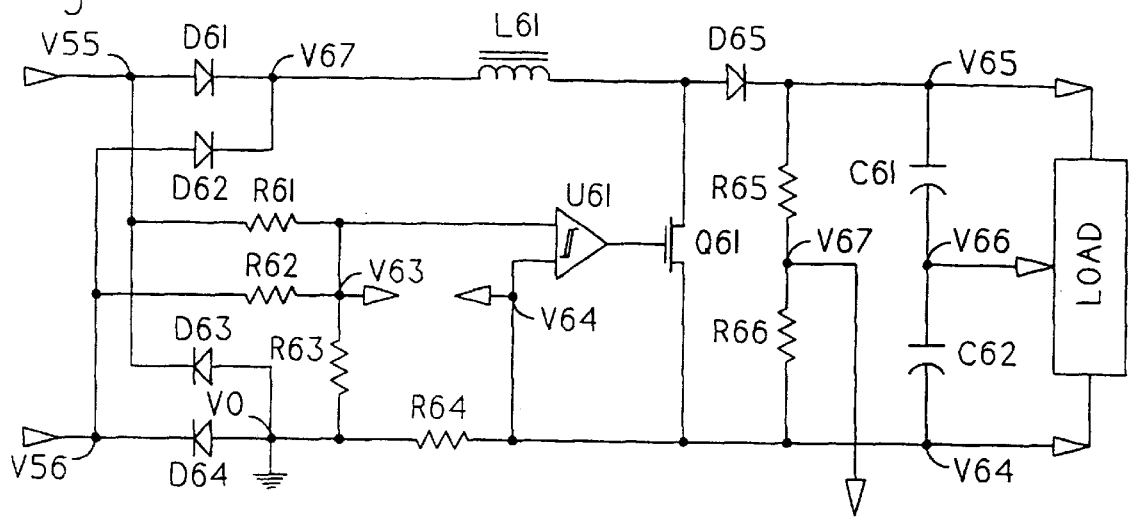
FIG. 6a shows circuitry and FIGS. 6b, 6c, 6d, 6e and 6f show waveforms of the power control stage of a DCEB.

FIG. 6a is a detailed schematic of the circuitry comprising several of the functional blocks of FIG. 4. The AC-DC converter 406 is comprised of diode bridge D61, D62, D63, and D64. Line voltage sense 405 is comprised of resistors R61, R62 and R63. Line current sense 407 is achieved by measuring the voltage across resistor R64. The DC-DC flyback boost inverter 408 comprises a comparator U61, switching transistor Q61, inductor L61, diode D65 and filter capacitors C61 and C62. A voltage limit signal V67-V0 is provided by a resistive divider comprising R65 and R66.

Figure 6B:
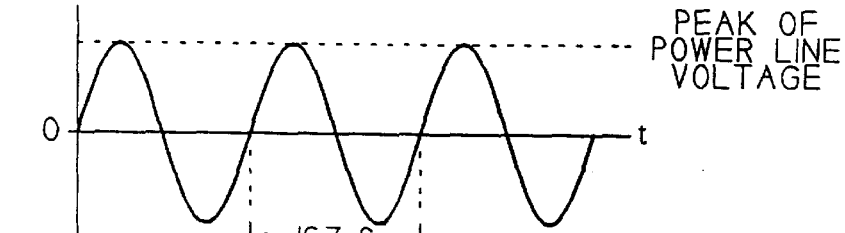
Figure 6C:
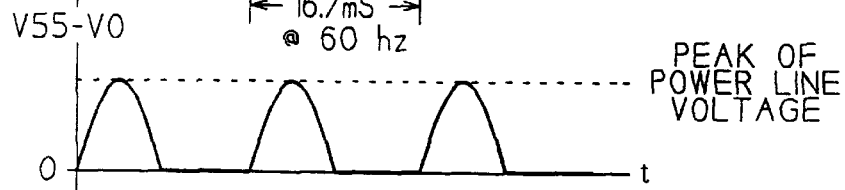
Figure 6D:
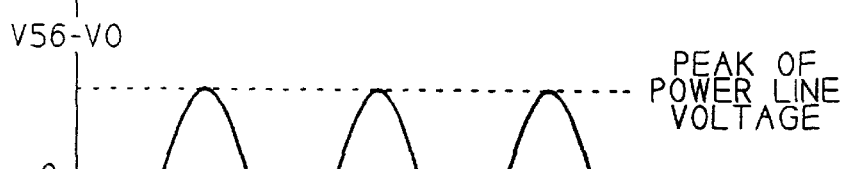
Figure 6E:
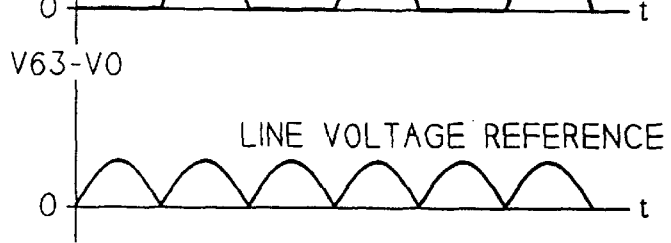
Figure 6F:
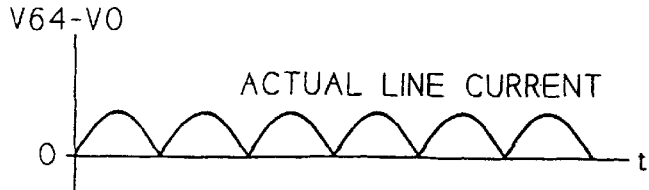
Figure 7A:
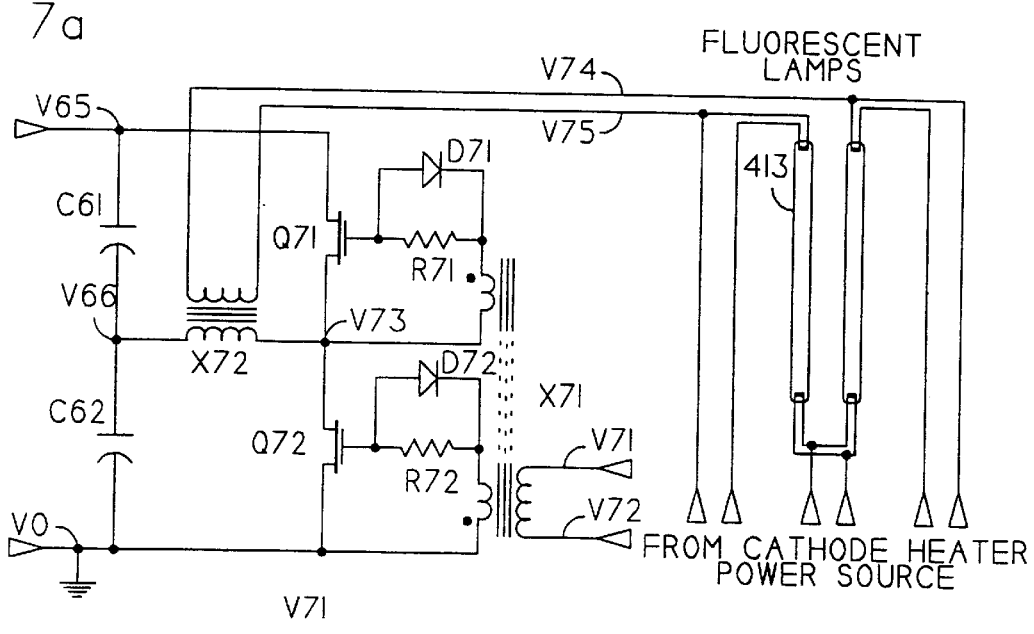
FIG. 7a shows circuitry and FIGS. 7b, 7c, 7d and 7e show waveforms of the lamp plasma drive of a DCEB.
Figure 7B:
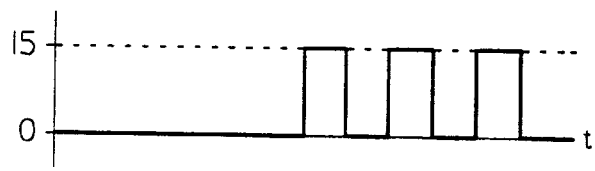
Figure 7C:
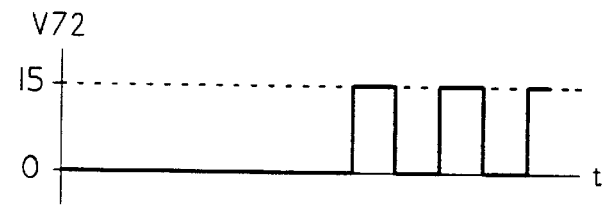
Figure 7D:
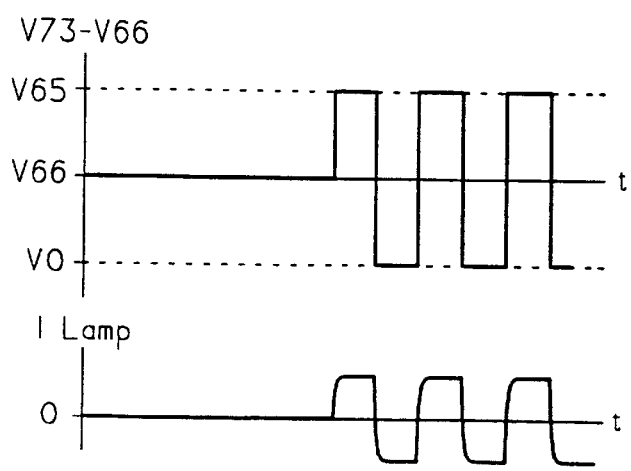
Figure 7E:
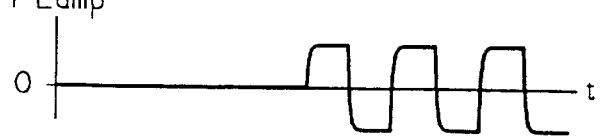

To further understand the operation of these circuit functional blocks in combination, FIG. 6b to FIG. 6f shows representative voltage waveforms that would be seen in the circuit. The AC power line input voltage measurxed as V55–V56 and shown in FIG. 6b, is applied to a rectifier bridge formed by diodes D61, D62, D63, and D64. Inductor L61, switching transistor Q61, diode D65, and filter capacitors C61 and C62 form a common flyback boost inverter configuration. The load across capacitor C61 and C62 represents the rest of the ballast circuit and the lamps. R61 and R62 are used to sense the input voltage waveshape. FIG. 6c and FIG. 6d show the voltages across resistors R61, R62 respectively. The value of R61 is the same as R62 and both are about 100 times the value of R63. The current through R61 and R62 is summed on resistor R63. The voltage on R63 as shown in FIG. 6e is a reference with the same waveshape and phase as the full wave rectified input line voltage V67-V0. The comparator U61 uses the voltage V63-V0 as a reference and turns the transistor switch on and off to try to make the voltage V64-V0 on R64, being representative of the line current and shown in FIG. 6f, match the reference voltage V67-V0. The value of R64 is chosen so that the desired line current drawn from the AC power line creates a voltage on R64 that is equal to the reference voltage on R63. For example, if the AC power line voltage is 120 volts and the power used by the ballast is desired to be 60 watts, then the line current would be 0.5 amps. If R61, R62 are chosen to be 120,000 ohms and R63 is 1000 ohms, then a reference of 1.0 volt rms would be created on resistor R63. Resistor R64 would be 2.0 ohms to make the voltage on R64 be 1.0 volt rms at 0.5 amps. The frequency and duty cycle of the comparator output is allowed to free-run in order to best match the line current waveform to the line voltage waveform. When the line current matches the line voltage, the Power Factor (PF) is unity and the Total Harmonic Distortion (THD) of the current waveform is minimized and will approach the THD of the line voltage waveform itself. Preferably, the comparator U61 is provided with a small amount of hysteresis to establish a maximum frequency of oscillation. The frequency of oscillation of the comparator is essentially determined by the value of inductor L61 and the amount of hysteresis in the comparator U61. The preferred frequency range would be between 20 khz to 60 khz. It will be shown later in this description that by effectively changing the value of resistor R63, the power drawn by the ballast from the AC power line can be changed. As described earlier, the power drawn by the ballast is proportional to the light produced by the fixture and this is the preferred method of providing dimming for this ballast.

Since the internal voltage V65-V0 is an independent variable, if a power level is selected and the lamps fail or are removed from the fixture as may be the case when the fixture is being re-lamped while still powered, the internal voltage would increase indefinitely and destroy circuit components in the ballast 113. A voltage divider consisting of resistors R65 and R66 is used to provide a voltage limit signal to the ballast control circuit 409 so that the DC-DC inverter can be shut off when the internal voltage reaches a preset maximum level. In the preferred embodiment, the components used in the DC-DC inverter 408 and the DC-AC converter 412 are rated for up to 800 volts so the preferred preset maximum voltage V65 is set for 700 volts.

A significant advantage of the preferred embodiment is that the functions of power line current power factor correction, minimizing the power line current harmonic distortion, and ballast power control are combined into a single circuit.

A second advantage of the preferred embodiment is that by controlling the input power to the ballast, the second internal DC voltage V65-V0 is an independent variable that will seek a level that is necessary to deliver the input power to the lamps. This feature is particularly useful to minimize the warm-up time of the lamps and minimize the effects of lamp aging and to accommodate variations in the lamp operating voltages from lamp to lamp.

FIG. 7 is a detail schematic of the DC-AC converter 412 and the converter drive 415 connected to a pair of fluorescent lamps 413. Fluorescent lamps are a negative resistance plasma device which means that if a true voltage source was connected across a lamp, the current would increase more and more until the lamp failed. It is necessary to provide a limit to the current available to the lamp. This current limiting means is commonly referred to as the "ballasting" means or ballast and, for lamps operated on an alternating voltage, is typically accomplished with an inductive reactance in series with the lamps. "Ballasting" of the lamp in the present invention is achieved by limiting the power transfer from the first DC voltage V67-V0 to the load DC supply voltage V65-V0. Additional "ballasting" can be provided by an inductance in series with the lamps. The primary purpose of this inductance as part of the "ballasting" circuit is to provide rate-of-change-of-current control, or di/dt control. It is possible to operate the lamps without the supplementary ballasting inductance but the radiated Radio Frequency energy from the lamps may be unacceptable. It is preferred that the output drive transformer X72 have the primary and secondary windings separated horizontally on a E-type ferrite core that is provided with a gap on the center leg of the E-core. Such gap provides some uncoupled inductance for the primary and secondary windings that will provide di/dt control to provide a lamp current waveform shown in FIG. 7e.

The output voltage V65 of the DC-DC flyback inverter 408 of FIG. 6 provides the power source to deliver to the lamps. In the preferred embodiment, the filter capacitors C61 and C62 divide the voltage V65 to provide a supply voltage V66 for the primary of transformer X72. Drive transistors Q71 and Q72 are alternately switched ON and off at a fixed 50% duty cycle and a repetition rate of preferably 40 khz. The drive for the gates of the switching transistors is provided by a single drive transformer X71. The primary of the drive transformer is powered directly from the ballast control circuit 409 preferably using a full bridge drive circuit. The two secondary windings are connected in opposite polarity to the gates of the drive transistors through a circuit that provides fast turn-off through diode D71 and a delayed turn-on through resistor R71. The time constant created with resistor R71 and the gate capacitance of the FET transistor Q71 provides about one microsecond of delay on turn-on so that Q72 can turn off and the load inductance of X72 can cause the voltage V73 to commutate up to the supply rail V65. This time delay reduces switching losses in the transistors and contributes to the improved efficiency of this converter circuit.

In order to achieve the desired soft start sequence for the lamps as described in detail later in FIG. 9, the voltage applied to the lamps V75–V74 must be turned on only after the cathodes have been adequately heated. The plasma current can be turned on and off by applying or removing transformer X71 primary drive from the ballast control circuit 409.

FIG. 8 and FIG. 9 show how the preferred embodiment applies a soft start sequence to the lamps to minimize damage to the lamps with repeated ON-OFF cycles. The control voltage V54 created by the circuit of FIG. 5a is used to provide the four phases of operation shown in FIG. 8. If the duty cycle of the control signal V51-V0 shown in FIG. 8 is less than 25%, the ballast is to operate at the maximum light level. For duty cycles between 25% and 75%, the light output of the ballast will be variable and will reduce from the maximum light level to the minimum light level respectively. One reason for having the control signal seemingly reversed is so that if a ballast was used in a stand-alone application without a zone controller, it would default to being "ON" at maximum light level whenever power is applied to the ballast. A second reason for the preferred control concept is that if there was a failure of the zone controller circuit and the signal was absent, the lights in the control zone would default to being "ON". If the duty cycle is between 75% and 80% then the light level would remain at the minimum level. If the duty cycle is greater than 80% (or some other given level), then the ballast would be turned "OFF" and the soft start timer would be reset so when the ballast is turned "ON" the next time, the lamps would be provided with the proper soft start sequence. Another feature of the preferred control method is that if there was noise on the modulated waveform around the 75% duty cycle, the ballast would not turn "ON" and "OFF" since there is a noise margin about 5% of the duty cycle. The control signal generated by the zone controller 108 steps from a duty cycle of 75% to a duty cycle of 85% to ensure that the ballasts turn off cleanly. Another feature of the control signal generated by the zone controller 108 is that when the ballasts are requested to turn "ON", the duty cycle is stepped from 85% to at least 50% to ensure that when the lamps are started cold, they will be allowed to warm up quickly so that they will operate without flicker. If the light level setpoint is intended to be less than 50%, then the zone controller gradually reduces the light level by increasing the duty cycle to the setpoint level. The detail description of the operation of the zone controller follows with reference to FIG. 15 and FIG. 16.

Figure 9A:
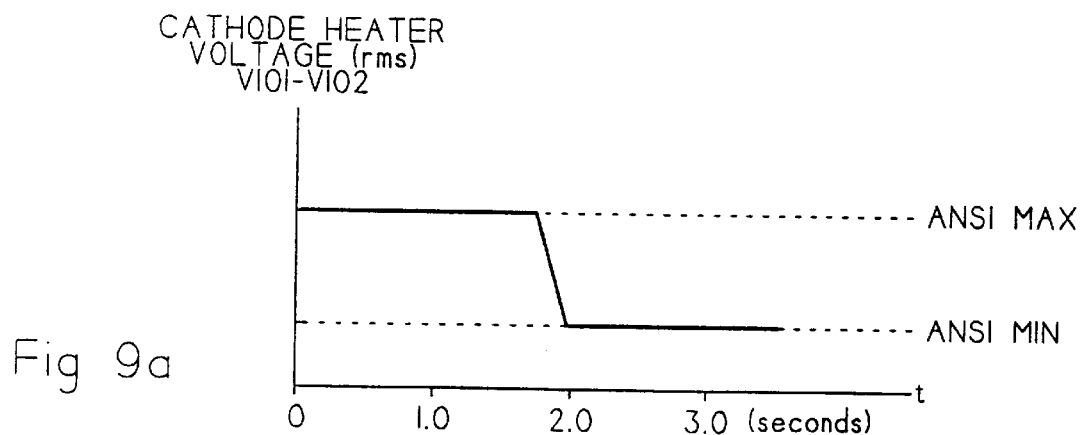
FIGS. 9a and 9b show curves describing the International Electrotechnical Commission (IEC) soft start sequence for rapid start lamps that is provided by a DCEB.
Figure 9B:
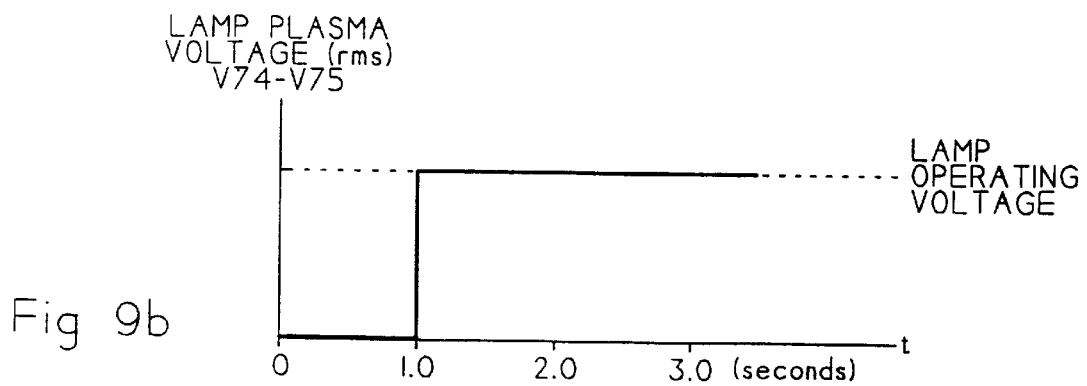
Figure 10A:
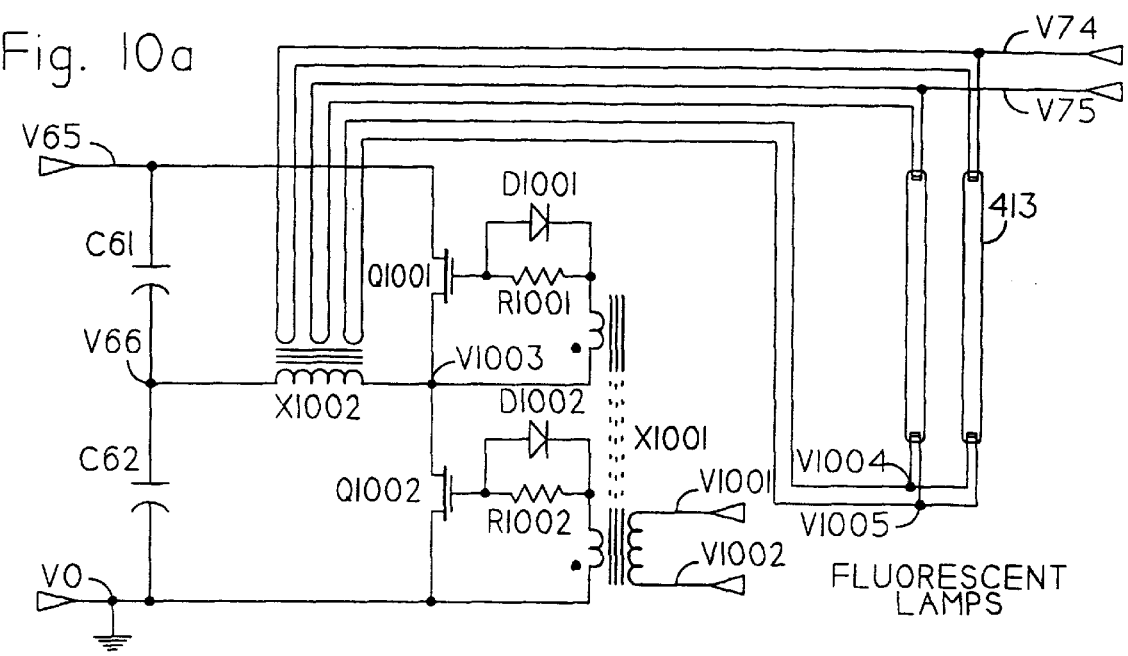
FIG. 10a shows circuitry and FIGS. 10b, 10c and 10d show waveforms of the cathode heater drive of a DCEB.
Figure 10B:
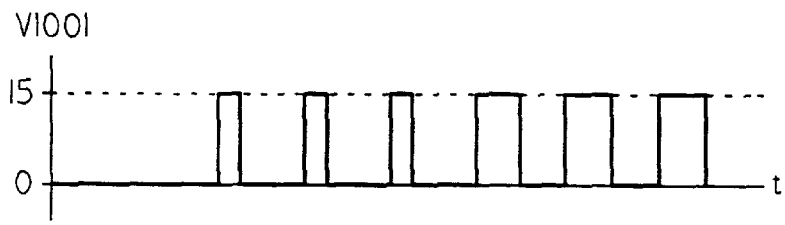
Figure 10C:
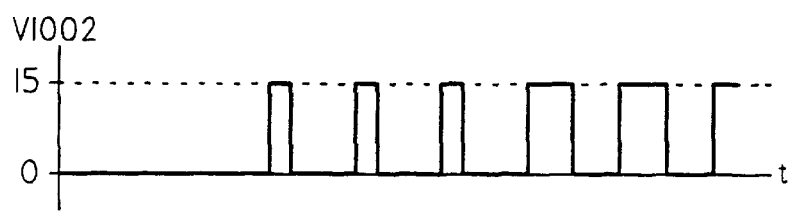
Figure 10D:
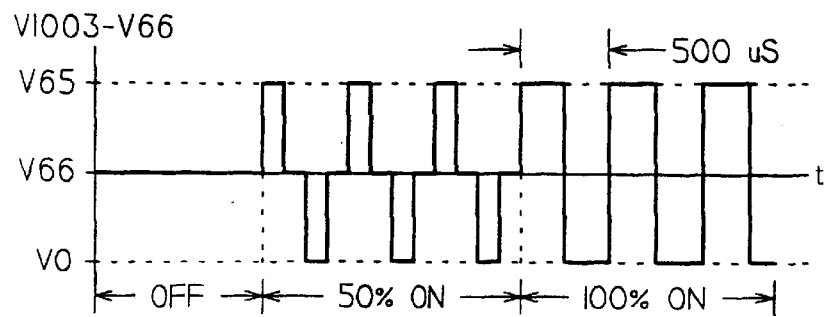

The soft start sequence that is applicable to bi-pin rapid start fluorescent lamps is described in the IEC standard 929 and is summarized in FIG. 9. In order to minimize the damage to a fluorescent lamp during starting of the lamp, it is necessary to heat the cathodes to their emission temperature before trying to establish the plasma current through the lamp. Bi-pin fluorescent lamps have connections from transformer X1002 to the cathodes that form a means to allow the cathodes to be heated separately from the plasma current. To minimize the time that is required to preheat the cathodes, it is desirable to apply a high voltage across the cathodes. For North America, the American National Standards Institute (ANSI) standard C78.1 identifies the maximum and minimum voltages that should be used to heat the lamp cathodes. During the soft start phase it would be desirable to use the maximum value of voltage recommended by the ANSI standard. Power applied to the lamp cathodes that is above that required to keep them above the minimum emission temperature does not contribute significantly to light output from the lamp but results in additional power being consumed. During lamp operation, it is desirable to provide a minimum value of cathode heat in order to minimize the energy consumption of the lamp. Referring to FIG. 9a, the cathode heater voltage is at the maximum ANSI level starting at time zero. FIG. 9b shows that after about one second, the plasma voltage is applied to the lamps. After the plasma voltage has been applied and the lamp has started, the cathode heater voltage is reduced to the minimum ANSI level as shown in FIG. 9a. The preferred ballast provides the lamp soft start sequence as above described and also maintains the minimum ANSI heater voltage during operation of the lamp independent of the plasma current (light output) of the lamps.

Figure 11B:
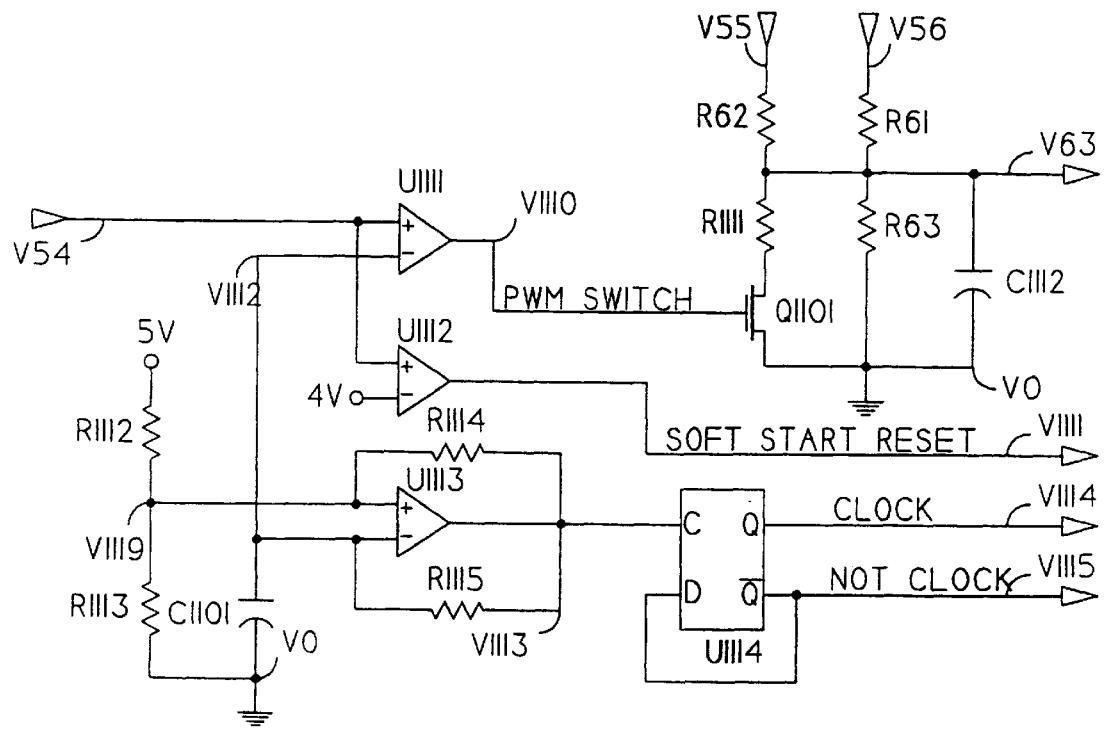
Figure 12A:
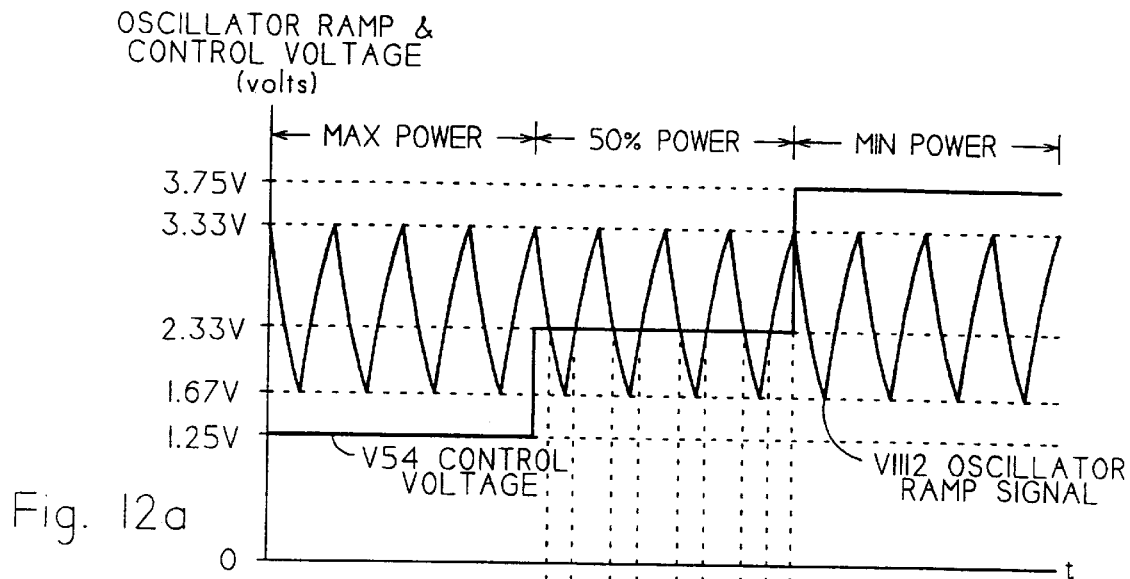
FIGS. 12a and 12b show waveforms and FIGS. 12c and 12d show curves describing the method of power control in a DCEB.
Figure 12B:
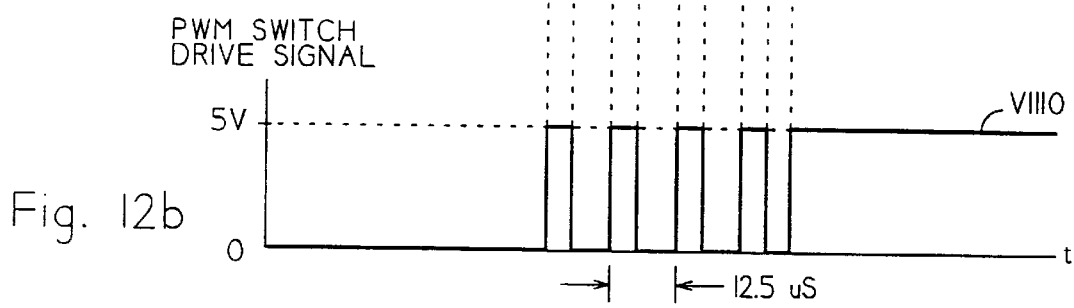

FIG. 10 shows the cathode heater drive circuit. The cathode heaters are a resistive load to the heater drive circuit so a variable duty cycle can be used to effectively change the heater drive power. Because V65 is an independent variable with ballast power, it reduces when the lamp power is reduced. Since the heater drive derives its primary power from the voltage V65, the duty cycle of the heater drive must increase when the voltage V65 decreases in order to maintain the minimum cathode heating voltage. The variable duty cycle drive is accomplished similar to that shown in FIG. 12a with the circuitry shown in FIG. 13c. The triangle wave oscillator of FIG. 11b provides the ramp signal V1112 which is shown in FIG. 12a. Comparator U1305 compares a heater control voltage V1302 to the ramp signal. When the control voltage V1302 is lower than the ramp then the output voltage of comparator U1305 is at a logic high level and the output of buffers U1308 and U1310 switch at a 50% duty cycle but out of phase to provide a full bridge drive output for the primary of transformer X1001. If the control voltage V1302 is within the range of the ramp signal V1112, then comparator U1305 will provide a modified duty cycle signal as shown in FIG. 12b which results in a lower voltage being applied to the cathodes of the lamps. If the reference voltage V1302 is higher than ramp signal V1112 then the heater drive will be off. By selecting the values of a resistive divider network comprising R1302, R1303, and R1304, the duty cycle of the heater drive V1001–V1002 can be modified to maintain a constant rms value when the voltage V65 changes due to dimming of the lamps. When the ballast is in its OFF state, the cathode heater drive is turned off by holding the control voltage V1118 at a logic low level.

Figure 11A:
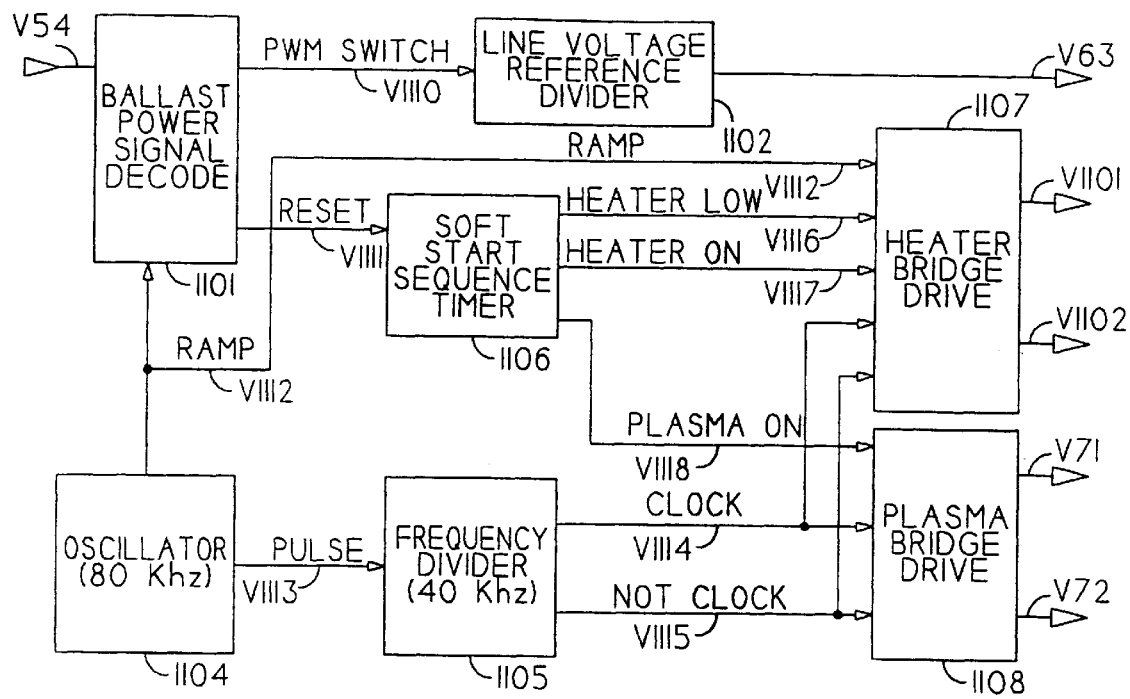
FIGS. 11a and 11b show a block diagram and circuitry used to implement dimming and soft start control in a DCEB.
Figure 12C:
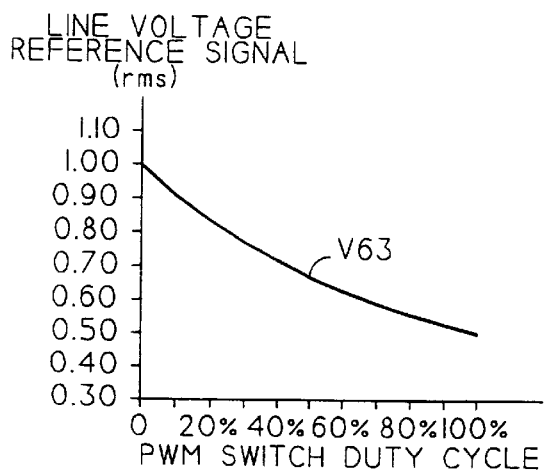
Figure 12D:
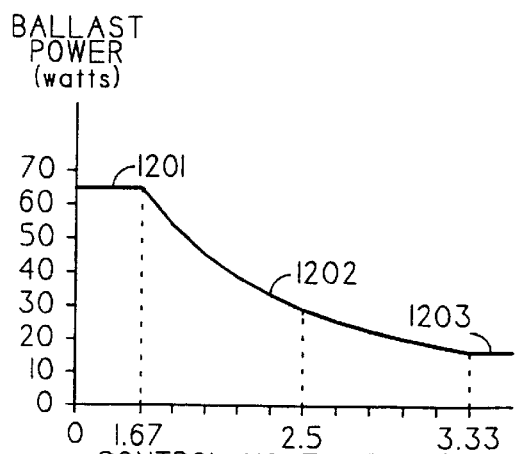

FIG. 11a shows how the control voltage signal V54 generated by the circuitry in FIG. 5a is decoded to provide a variable power level. Power control is effected with a means to reduce the reference signal V63 to the input power inverter. Transistor switch Q1101 is used to connect R1111 in parallel with R63 to provide a power level adjustment circuit responsive to the control voltage signal V54. If transistor Q1101 is OFF, then only R63 is used in the divider and the reference voltage is at its highest value. If transistor Q1101 is ON all the time, then R1111 is in parallel with R63 and the signal V63 is at its lowest value. The duty cycle of the signal V1110 as shown in FIG. 12b changes when the control voltage V54 is within the range of the ramp signal V1112. The duty cycle of the output of comparator U1111 changes and because of transistor Q1101, the effective resistance of R63 changes to provide a modified reference voltage as shown in FIG. 12c. Since the power consumed by the ballast relates to the square of the line voltage signal, the ballast power is shown in FIG. 12d with respect to the input control voltage V54. Capacitor C1112 is a small value that will filter the high frequency control signal V1110 but allow the 120 hz component of the fullwave rectified line voltage shown in FIG. 6e to pass with minimal distortion. It is preferred that R1111 be the same value as R63 so that the minimum power level is 25% of the maximum power level. The non-linearity of the power control is not a problem since the zone controller can output a duty cycle to compensate for such non-linearity. Also, this power level control is sensitive to changes in power line voltage but again, the zone controller measures the power line voltage and changes the power control signal to maintain relatively constant ballast power with respect to power line voltage.

Figures 13A, 13B:
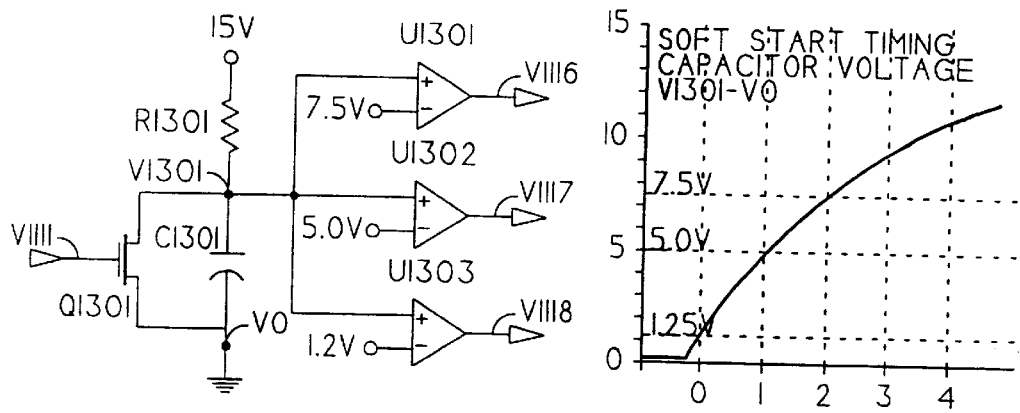
FIGS. 13a and 13c show circuitry and FIG. 13b shows waveforms describing the method of heater power control used in a DCEB.
Figure 13C:
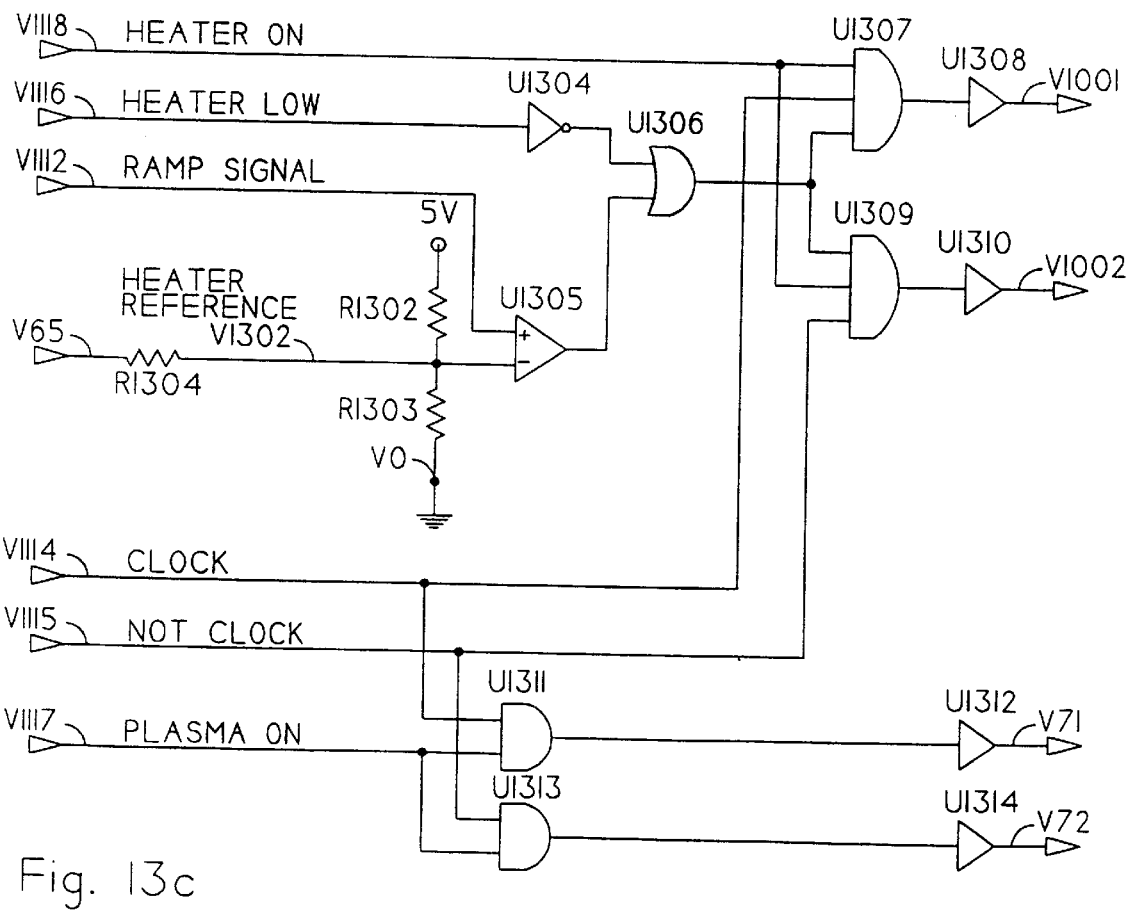

FIG. 13a shows the circuitry used to implement the preferred soft start sequence. A soft start timer voltage V1301 is generated by resistor R1301 and capacitor C1301 with a time constant of about 3 seconds. If the control voltage V54 from the control signal detector or communication receiver 401 is greater than the 4 volt reference on U1112 of FIG. 11b, the output V1111 goes to a logic high level. This turns switch transistor Q61 ON and resets the voltage on C1301 to zero and all of the comparators U1301, U1302, and U1303 outputs go low which sets the ballast into a standby mode with the heaters and the plasma OFF. When the control signal V54 is below 4 volts, it signals the ballast to begin a soft start sequence and the voltage V1301 on capacitor C1301 is allowed to rise according to the curve in FIG. 13b. When V1301 passes the 1.2 volt reference, U1303 enables the heater output drive on maximum duty cycle. About one second later, voltage V1301 passes the 5 volt reference and U1302 enables the plasma drive via U1311 and U1313. About one second later, voltage V1301 passes the 7.5 volt reference and U1301 switches the heater drive to operate at in a variable duty cycle mode at less than 50% duty cycle to reduce the rms voltage applied to the lamp cathodes. FIG. 13c shows the logic circuitry used to implement the bridge output drives for the plasma inverter and the heater inverter.

In the preferred embodiment, the ballast control circuit 409 is provided by a NegaWatt Technologies (Edmonton, AB, Canada) NW120032CP ballast control integrated circuit that combines all of the required control functions into an 18 pin integrated circuit. The function of the circuitry described in FIG. 11b U1111, U1113, and U1114, FIG. 13a U1301, U1302, and U1303, FIG. 13c, and FIG. 6 U61 are provided by the integrated circuit chip. In addition the NW120032CP integrated circuit provides a safe power-up sequence for when power is first applied to the ballast, over-voltage shutdown, under-voltage lockout, high voltage regulation during soft start and during operation without lamps, voltage references, continuous power supply to operate the communication receiver circuit, ballast over-temperature shutdown for the ballast drive circuits, the plasma output drive is designed to directly drive a FET transistor, the bridge output drives for heater and plasma are designed to directly drive transformer loads without external transistors, and the bridge output drives are protected for inductive load switching. The primary purpose of combining the functionality of all of the above circuit functions is to minimize the parts needed to manufacture the ballast and therefore minimize the production cost of the ballasts.

Figure 14:
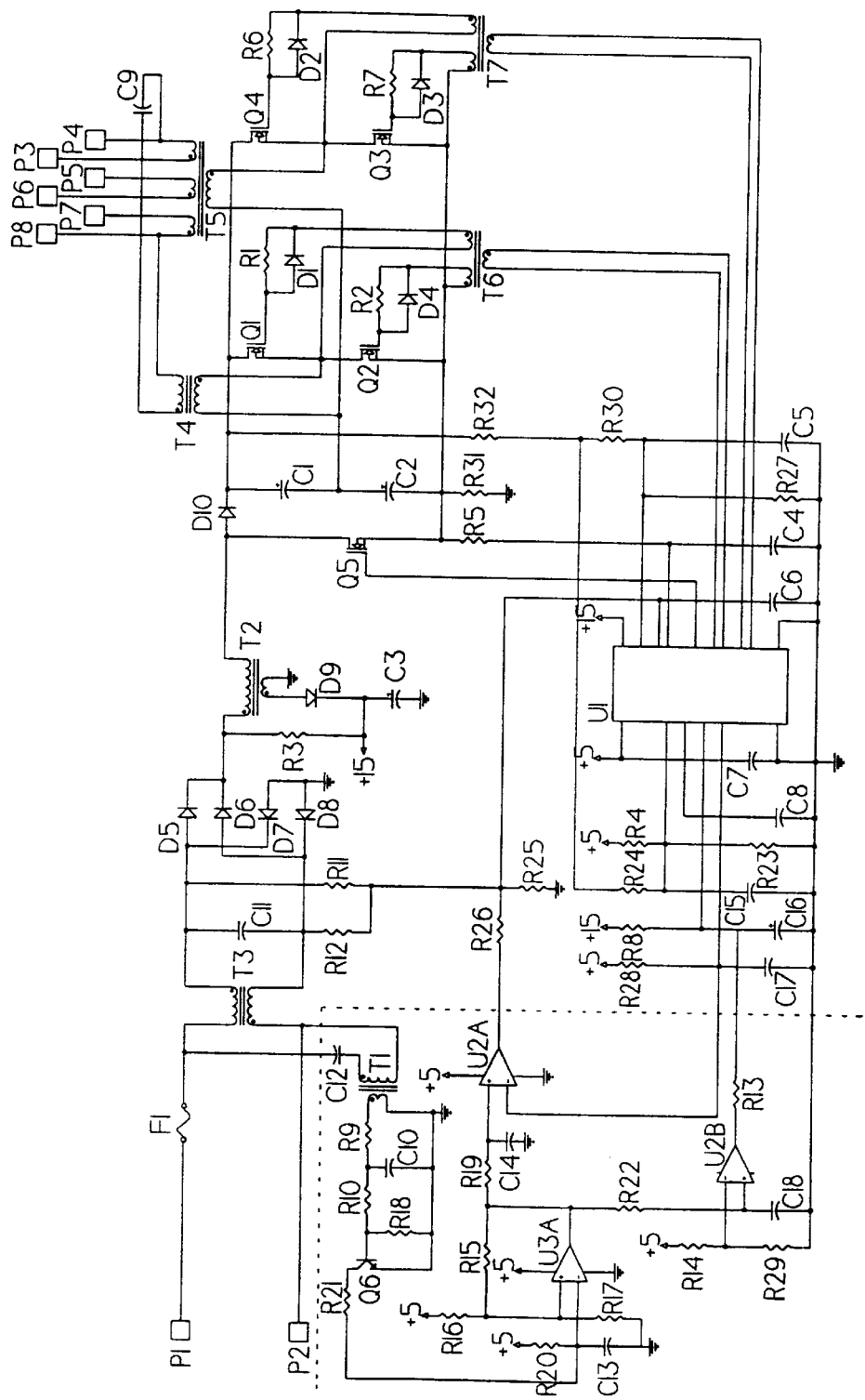
FIG. 14 shows a detailed schematic of a preferred embodiment of the DCEB.

FIG. 14 shows the complete schematic of the preferred DCEB with a CCC receiver implemented with discrete components. By comparing the number of components required to implement this full feature ballast to prior art that does not have soft start or communications or may not have dimming capability, it can be seen that this ballast can be manufactured at a low cost, which is a primary objective of the present invention.

Although the present embodiment uses analog timing, analog power control, analog oscillators, and analog voltage comparators to provide the desired control, in another embodiment, the control functions could be provided by digital and microprocessor circuitry. There will be a requirement for analog circuitry to provide voltage references, power supply regulation, voltage comparator functions, and drive circuitry for the switching transistors.

Figure 15:
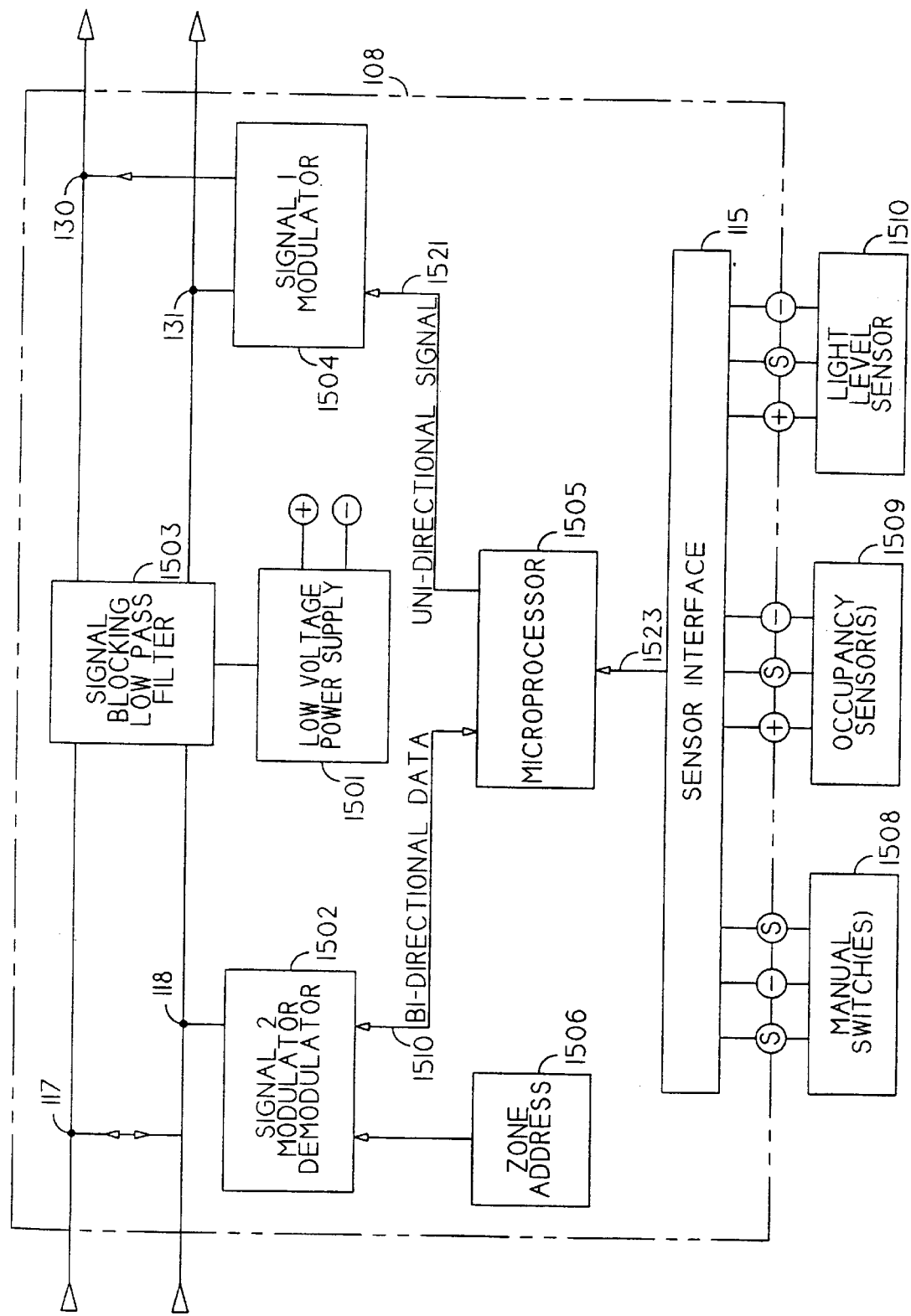
FIG. 15 shows a block diagram of a suitable zone controller.

FIG. 15 shows a block diagram of a preferred zone controller 108 to be used as a component of the lighting control system. The key elements of the zone controller include a low voltage power supply 1501 that provides power to operate the zone controller circuitry as well as to power sensors 1508, 1509, and 1510 that are connected to the zone controller through the sensor interface 115. There is a signal modulator 1504 that couples a control signal onto the power line that supplies power to the light fixtures 101 that are connected to the load side of the zone controller. The uni-directional control signal 1521 sends power level and on-off control to the DCEB 113 in the fixtures, which DCEB is therefore responsive to the control signal 1521. A second modulator/demodulator 1502 is provided to implement bi-directional data 1510 communication with a central control computer 120. Since there are two different CCC signals, it is important that they do not interfere with each other so a signal blocking low pass filter 1503 is provided to isolate the CCC signals yet pass the 60 hz power through from the power distribution system 104 to the light fixtures 101. A microprocessor 1505 forming a control means and means to operate on signals from sensors 103 to condition the signals is used to respond to transmissions from the central computer, format data packets for the central computer, read the signals from the various sensors connected to the zone controller, monitor the power line voltage, provide response timing, fade rate timing, setpoint comparisons, and format the power level control signal duty cycle to send to the ballasts. The microprocessor 1505 may be obtained from any of several commercial vendors such as Intel and Motorola and may be programmed using the flow charts in FIG. 17–19 to carry out the functions described here. The actual software will depend on the microprocessor used.

From a communications point of view, it is preferred that the zone controllers be slaves of the central control computer in that they do not initiate a transmission onto the power line unless they receive a command from the central computer to do so. Using a master-slave configuration means that there is no need to account for data transmission errors due to collisions of transmissions. The data being transmitted between the central computer and the zone controller is a packet that contains address bytes, control bytes and data bytes as is common with local area networks. In the preferred embodiment the CEBus protocol for sending data and control packets is used. The system could be made to work with other commercially available CCC methods such as GE Homenet, X10, or Echelon. Each zone controller requires a unique address within one building control system. The preferred embodiment uses binary coded decimal switches to provide up to 999 zone addresses 1506 which are set at the time of installation of the zone controller. The central computer must be programmed to know what zone addresses are installed. In another embodiment, each zone controller would be programmed with a serial number at the time of manufacture. The CEBus protocol has a very large address range available so it is unlikely that two zone controllers would have the same serial number in an installation.

Figure 16:
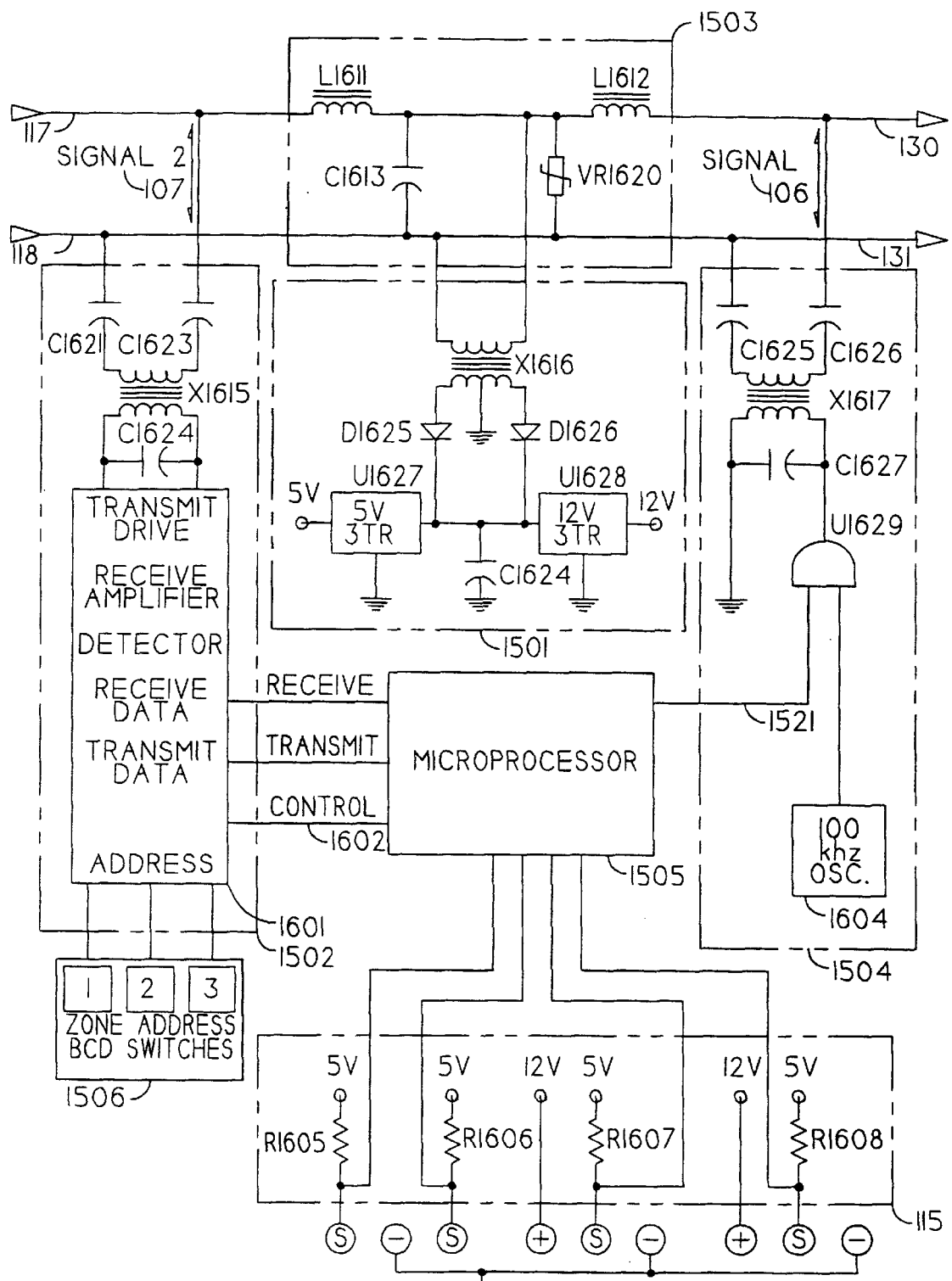
FIG. 16 shows circuitry used to implement a zone controller.

FIG. 16 is a simplified schematic of the circuitry in the zone controller. The low voltage power supply 1501 is isolated from the power system using a transformer X1616. Rectifier diodes D1625, D1626 and filter capacitor C1624 supply a pair of analog voltage regulators U1627, U1628 to provide 5 volts to operate the microprocessor circuitry and 12 volts for the sensors interface 115 and CCC modulator circuits 1502, 1504. A separate 100 khz oscillator 1604 is gated ON and OFF with U1629 to by a duty cycle control signal generated the microprocessor 1505 to produce the CCC power control signal 106 for the DCEB(s) 113. The signal blocking filter 1503 is accomplished using inductor L1611, L1612 and capacitor C1613 so that CCC signals from the power distribution system do not interfere with CCC signals to the DCEB(s). It is preferred that the signal blocking filter pass frequencies below 1000 hz and block frequencies above 10,000 hz. Although the signal blocking filter provides additional surge protection to the DCEB(s) connected as a load, further surge protection or transient suppression can be provided to the lighting control system by connecting a varistor VR1620 across capacitor C1613.

In a preferred embodiment, the Intellon CEBus protocol and CCC module can be used to implement the Signal-2 107 modulator/demodulator 1502. This module will accept BCD switch 1506 inputs for address selection and will look for communication on the power line that has an address header that matches. If a transmission destined for the address of the zone controller is detected, then the module will notify the microprocessor that data is available using the control line(s) 1602. When the zone controller receives a command from the central computer, it will respond by sending information about the current status of the zone back as an acknowledgement. The sensor interface 115 is accomplished with pull up resistors R1605, R1606, R1607, and R1608 with the logic level signals being read by the microprocessor 1505. In a further embodiment of the zone controller, additional filtering can be provided on the signals from the sensors to protect the microprocessor from potentially harmful electrostatic discharge from the sensor connection terminals.

Figure 17:
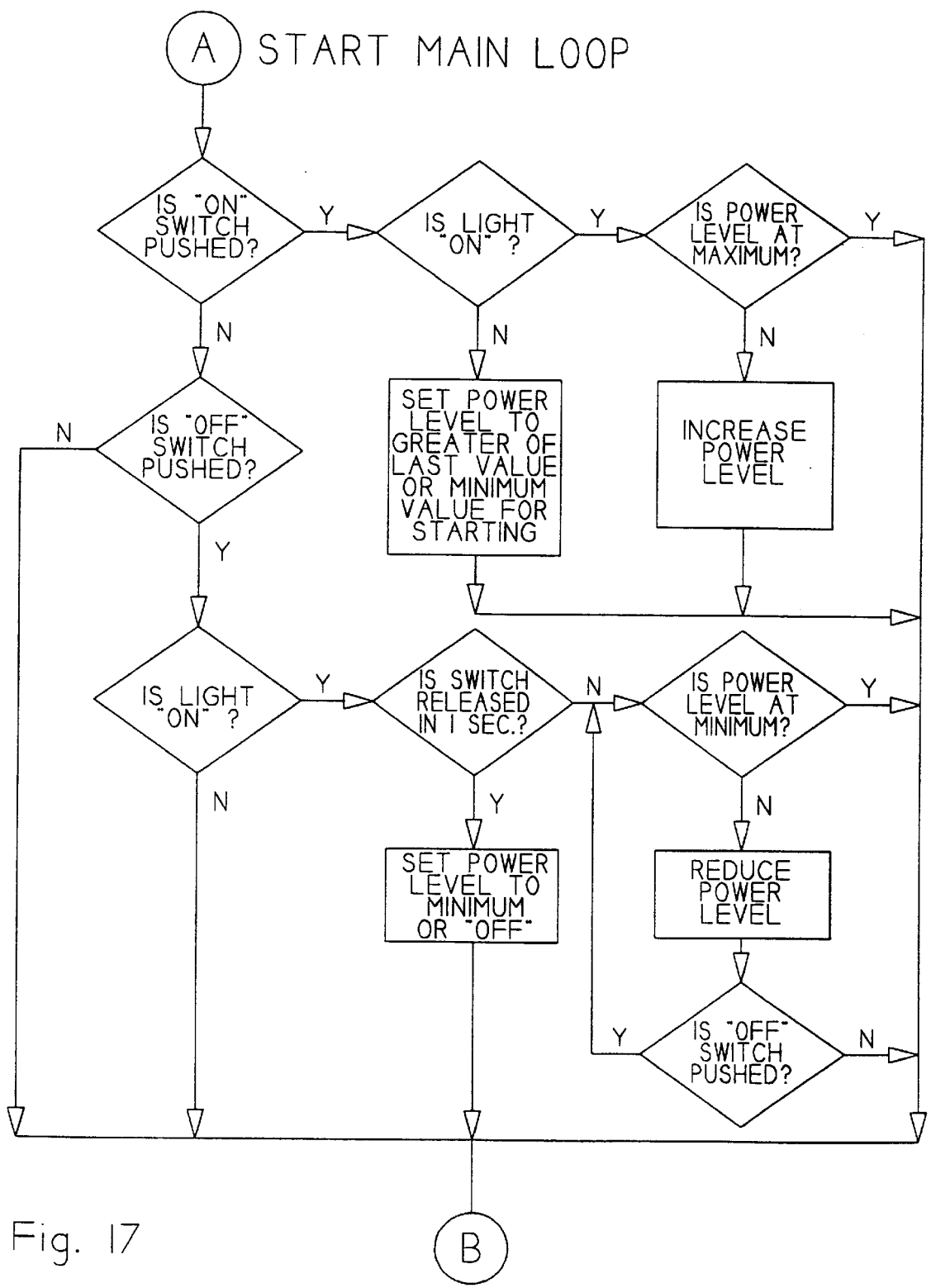
FIGS. 17, 18, and 19 show flow charts of the preferred software used in a zone controller.
Figure 18:
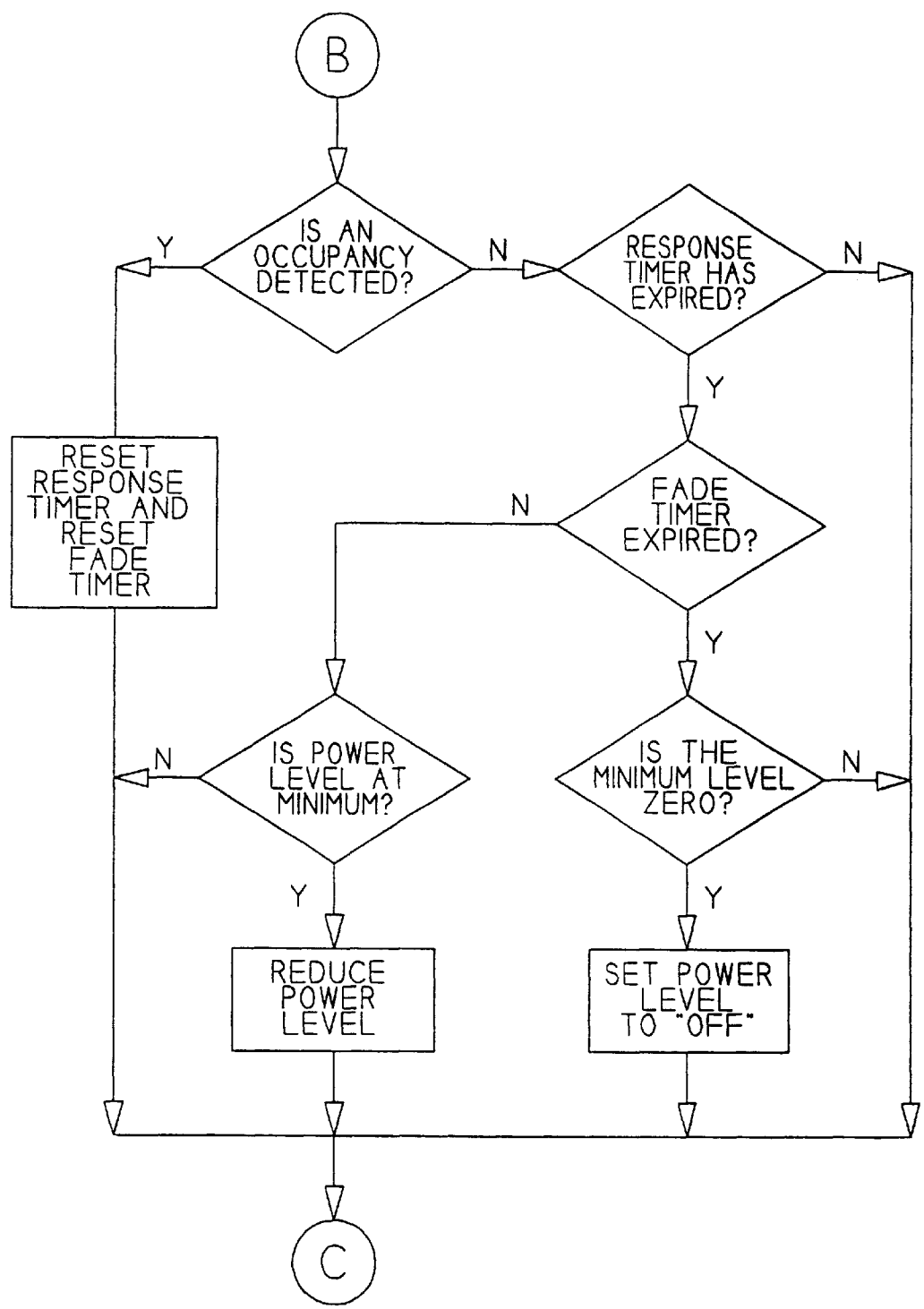
Figure 19:
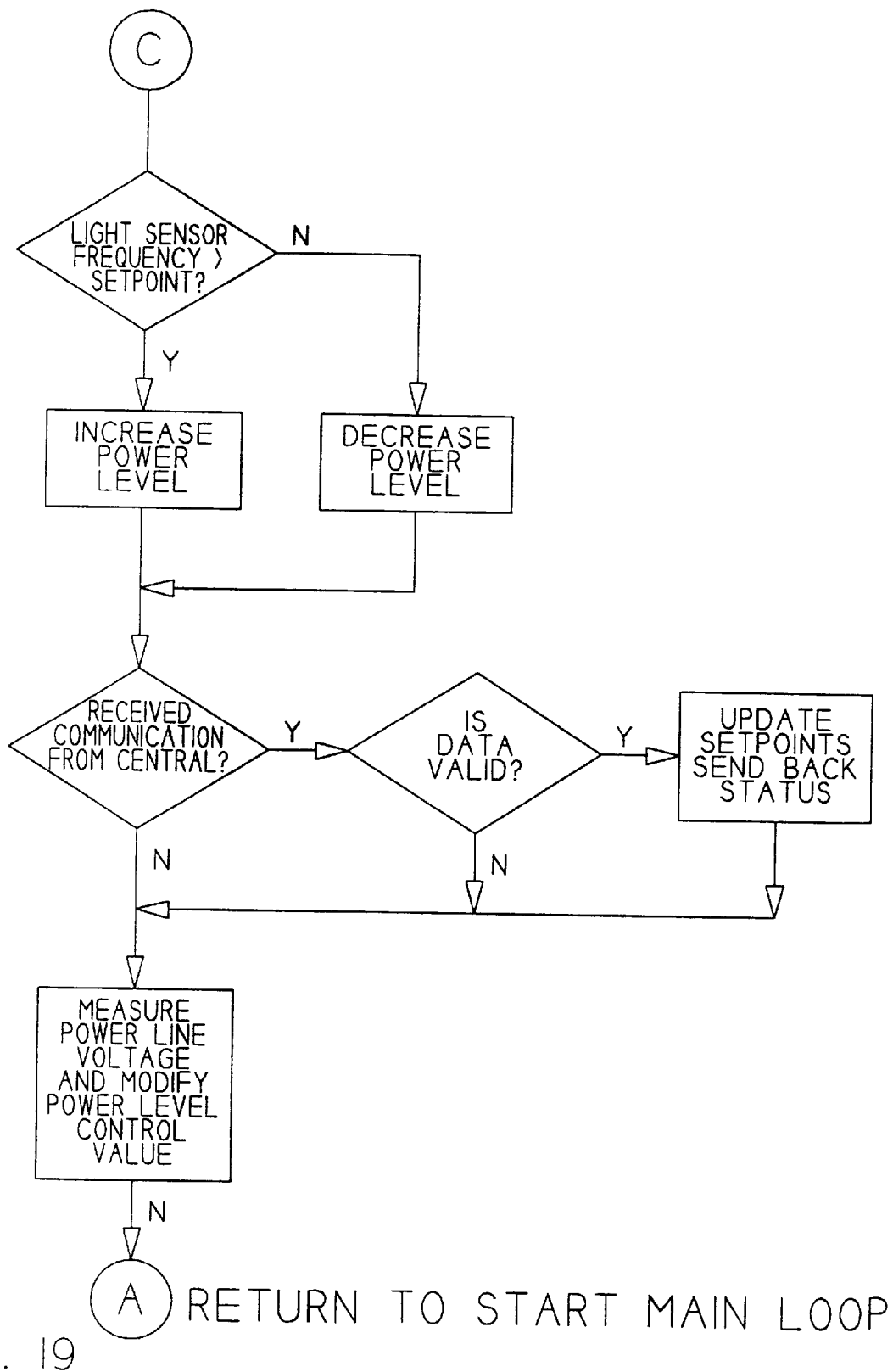

FIGS. 17, 18, and 19 show a flow chart of the software program used to operate the microprocessor in the preferred zone controller. FIG. 17 shows how switch inputs are processed to provide ON-OFF and manual dimming control of the fixtures in the zone. FIG. 18 shows how signals from occupancy sensors are processed and how the light power level can be faded from a normal value to a lower value or to zero. FIG. 19 shows how the light level can be regulated to a level being measured by a light sensor. FIG. 19 also shows that a signal from the communication receiver can be processed within the main program loop. FIG. 19 also shows that the power line voltage can be monitored and the duty cycle value being sent to the DCEB(s) in the zone can be modified to maintain a relatively constant light level independent of line voltage fluctuations.

Figure 20A:
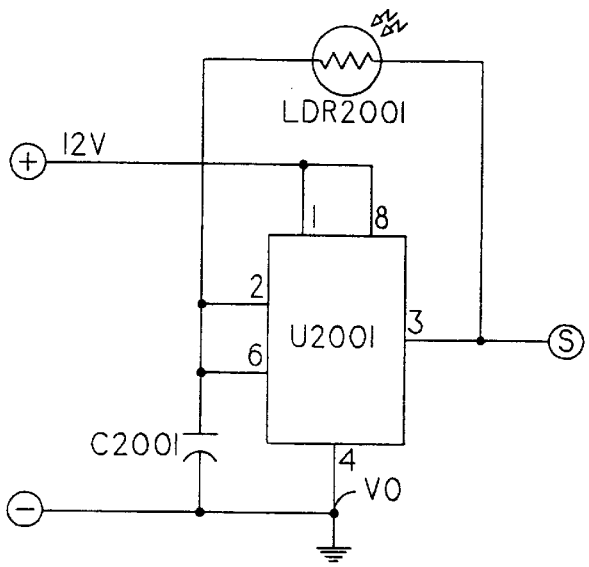
FIG. 20a shows circuitry and FIGS. 20b and 20c show curves of a preferred light level sensor.
Figure 20B:
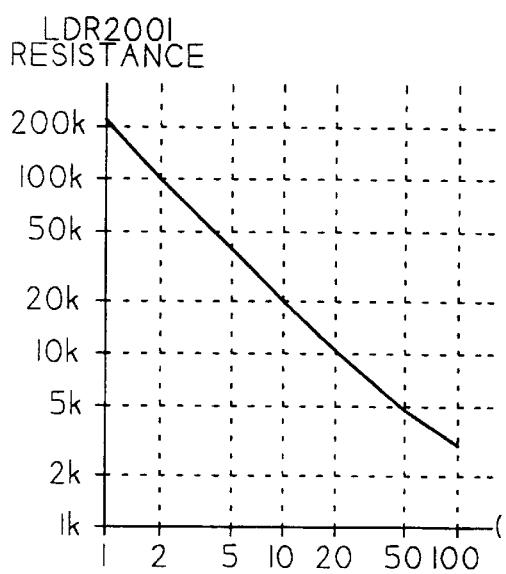
Figure 20C:
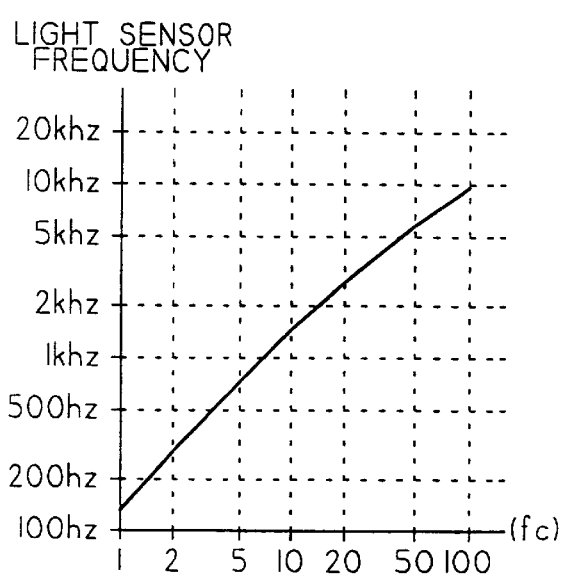

Referring again to FIG. 1 and then to FIG. 20, the lighting control system of the present embodiment can have a light level sensor 109 connected to the zone controller 108. A light level sensor would provide an appropriate input signal for a zone that has access to daylight. At times of the day when sufficient light is available from the daylight through windows, then the artificial light produced by the lighting system could be reduced or turned off to save energy. In the preferred embodiment, a suitable light level sensor would provide an analog indication of the level of light "seen" by the sensor. Prior art light level sensors for daylight harvesting lighting controls start with an analog light level sensor but have circuitry that provides a switched output if the light level is above or below a setting. The setpoint must be adjusted at each light sensor. In the present embodiment, the light level setpoint is set in the software of the zone controller which means that the circuitry in the light level sensor can be much simpler and therefore less expensive to manufacture. The circuitry of the preferred embodiment shown in FIG. 20a is able to provide a wide range of operation from 100 to 1. Light level sensor elements such as photodiodes or photo-resistive elements LDR2001 have adequate range in sensitivity as shown in FIG. 20b. The variable current from the sensor element LDR2001 must be converted into a digital signal that can be processed by the zone controller. In the preferred embodiment, the circuit of FIG. 20a converts the variable current through the photo-resistive element to a variable frequency using a common integrated circuit such as an industry standard LM555 shown as U2001. The frequency of operation of the circuit is determined by the characteristics of the light dependent resistor LDR2001 and the timing capacitor C2001. FIG. 20c shows a typical output frequency vs light level that is achieved. For the present invention, the absolute frequency presented at the output terminal for a specific light level is not important since the setpoint frequency for controlling the light level in the zone is set in software of the zone controller. Measuring frequency accurately over a wide range is easy to do with the software in the zone controller without requiring an Analog to Digital converter.

Referring again to FIG. 1, the lighting control system of the present invention can have occupancy sensor(s) 110 connected to the zone controller 108. The purpose of occupancy sensors is to determine if people are actively working in the control zone. If no person is there, the artificial lighting can be reduced to a minimum level or could be turned off to save energy. Occupancy sensors are commercially available as inputs for security monitoring systems, for security lighting control systems, and for general lighting control systems. Such sensors containing additional circuitry is not required for application in the present lighting control system.

Figure 21A:
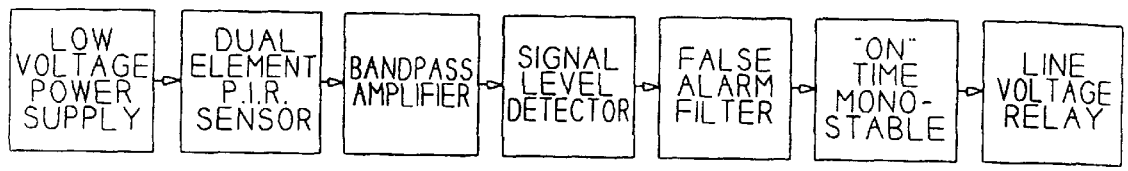
FIG. 21a shows a block diagram of a prior art sensor system.

FIG. 21a shows a block diagram of the functions used in a conventional Passive Infra Red (PIR) occupancy sensor used to switch a line voltage lighting load. These sensors generally operate from an internal low voltage supply and provide an output switch closure for a preset duration of time. If further motion is detected within the delay time, the delay time is extended. The "ON" time is usually manually adjustable. Other occupancy sensors used for security monitoring generally operate on a low voltage power source and provide a switch output signal whenever motion is detected, when power is disconnected from the device, or when the enclosure of the sensor is opened or tampered with. The additional circuitry and components used in these types of sensors is not required for an occupancy sensor used in the present embodiment.

FIG. 21b shows a block diagram of the functions required for occupancy sensors that are suitable for the preferred embodiment using a dual element PIR sensor, bandpass amplifier and signal level detector. Suitable sensors do not require additional power supplies, line voltage switching means, an adjustable time delay or false alarm filtering.

Figure 21C:
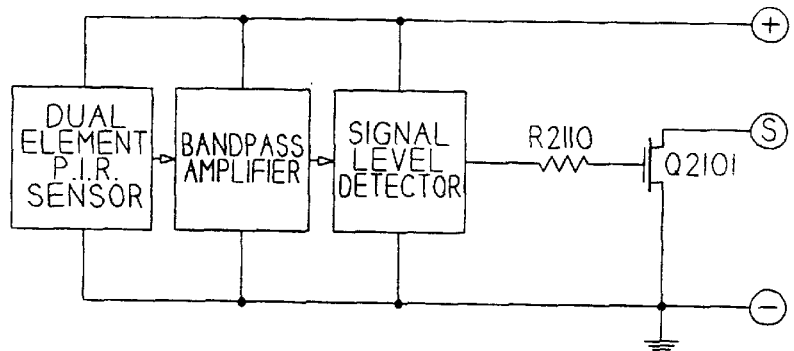
Figure 21C:
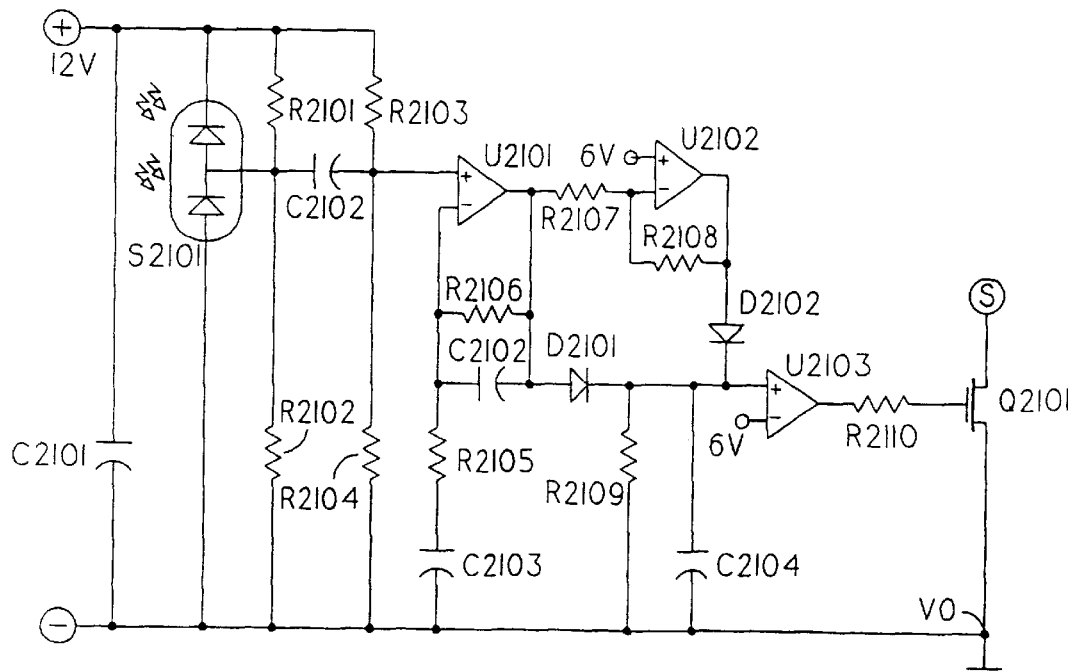

FIG. 21c shows a basic circuit for a preferred embodiment of the occupancy detectors. The detector is a dual element PIR sensor S2101 that detects changes in light impinging on two adjacent photosensitive semiconductor junctions. When an object in the field of view of the sensor moves in front of a lens, the level of light received by each element changes and a signal is produced. An AC coupled amplifier U2101 is typically used to amplify the signal. A threshold detector U2102 and U2103 is used to provide an output signal whenever the AC signal from the sensor pair exceeds the 6V threshold. The output signal is then driven with an open collector transistor Q2101 with a pull-up being provided in the zone controller 108 sensor interface circuit 115.

Referring again to FIG. 1, the lighting control system is preferred to have a central controller 105 even though the zone controllers are capable of providing immediate response to sensor inputs connected to the zone controller. A central control computer 120 is connected to a communication modulator/demodulator 121 that allows communication to the zone controller(s) 108 that are distributed throughout the building. It is preferred that the communication method is using Current Carrier Communication (CCC) by superimposing the communication signals 107 onto the power distribution wires 117, 118 already existing in the building. A suitable CCC means is to use an Intellon (Ocala, Fla., USA) module part number CEMac-pl a CEBus Power Line Media Access Card that uses the Intellon CELinx-pl Integrated Circuit. It is preferred that the communication signal 107 be two direction so that the central controller 105 can send data to and receive data from each zone controller 108.

The central computer 120 can have a means for the operator to directly control light levels in the zone and set minimum and maximum light levels 122 that are suitable for each control zone 102. Minimum light levels may be advantageous for hallways for security lighting or after-hour general lighting. Hallways can generally be operated at 75% of the original design light level and zones that use video display monitors can generally be operated at 50% of the light level required for detail paperwork. Again, setting maximum light levels to less than full light output directly reduces the energy used by the lighting system.

The central computer 120 can also have a means for the building manager to input a schedule of occupancy 123 for each zone. In an application at school for example, the schedule for classes using a particular room can be used to reduce light levels or turn lights off when the room is to be unoccupied.

The control parameters of the zone controller 108 for light level, response times, and fade rates can be adjusted by the central control computer 120 either manually by the building manager with the zone response setpoints 124 or automatically by looking at occupancy patterns in the zones. For example, the delay times for occupancy detection can be optimized with reference to the occupancy patterns in the zone. The computer can monitor occupancy periods and set the delay time to the maximum expected occupancy period.

Another way to optimize the energy efficiency of the complete building would be to interface to the heating, ventilation, and air conditioning (HVAC) system through an HVAC interface 125. If the HVAC is also controlled in zones, when zones are not occupied, the HVAC can be reduced for that zone.

By being able to monitor the operating status of each zone, the central computer can determine the instantaneous power used by the lighting system. If there is additional information provided by a load shed and peak demand input 126, then the lighting load can be reduced at times of peak demand which will reduce the overall power cost for the building.

The central computer 120 can have means for connection to a telephone or modem interface 127. Operating parameters for the lighting system can be monitored or modified remotely via telephone modem. This is an advantage for utility companies to directly control the utility loads and achieve real-time demand side load management.

The lighting control system would preferably have occupancy sensors 110 distributed throughout the building. The central computer 120 can read the status of the occupancy sensors connected to the zone controllers and this information can be relayed to an intrusion monitoring system. With a security system interface 128 to the central computer, it is possible to enable after-hours lighting only in zones authorized for use by those working after-hours.

Since the central computer 120 is capable of obtaining operating status information from the zone controllers 108, the effective operating hours of the lamps in the fixtures 101 may be logged to provide statistical information to assist with preventative maintenance by preparing a maintenance schedule 129.

The power distribution system 104 used in the building is conventional and requires no modification to function as the CCC medium in this application. Most large buildings use independent power systems for lighting and operate at 277 volts or 347 volts from line to neutral. Most power systems are three phase which requires a 3 phase communication modulator/demodulator 121 and the zones operate on individual phases of the power system. The advantage of the preferred embodiment is that only minor changes are needed to retrofit a full feature lighting control system in existing buildings operating on any commercial power voltage.

One of the important features of the present invention and the description of a preferred embodiment is that the lighting control system is very flexible and comprehensive in scope so that it can take advantage of all aspects of minimizing energy consumption. There are many combinations of control features and capability that will become apparent to one skilled in the art when implementing a lighting control system.

| Table of component values for FIG. 14 | |
|---|---|
| Part Reference | Part Description |
| R1 | 100 Ω 5% 1/4W |
| R2 | 100 Ω 5% 1/4W |
| R3 | 47,000 Ω 5% 3W |
| R4 | 649,000 Ω 1% 1/4W |
| R5 | 680 Ω 5% 1/4W |
| R6 | 270 Ω 5% 1/4W |
| R7 | 270 Ω 5% 1/4W |
| R8 | 82,500 Ω 1% 1/4W |
| R9 | 10 Ω 5% 1/4W |
| R10 | 10,000 Ω 1% 1/4W |
| R11 | 324,000 Ω 1% 1/4W |
| R12 | 324,000 Ω 1% 1/4W |
| R13 | 4,700 Ω 5% 1/4W |
| R14 | 4,020 Ω 1% 1/4W |
| R15 | 100,000 Ω 1% 1/4W |
| R16 | 10,000 Ω 1% 1/4W |
| R17 | 10,000 Ω 1% 1/4W |

-continued

Table of component values for FIG. 14

| Part Reference | Part Description |
|---|---|
| R18 | 10,000 Ω 1% 1/4W |
| R19 | 200,000 Ω 1% 1/4W |
| R20 | 10,000 Ω 1% 1/4W |
| R21 | 10,000 Ω 1% 1/4W |
| R22 | 100,000 Ω 1% 1/4W |
| R23 | 14,300 Ω 1% 1/4W |
| R24 | 1,000,000 Ω 1% 1/4W |
| R25 | 10,000 Ω 1% 1/4W |
| R26 | 3,320 Ω 1% 1/4W |
| R27 | 21,000 Ω 1% 1/4W |
| R28 | 13,700 Ω 1% 1/4W |
| R29 | 1,000 Ω 1% 1/4W |
| R30 | 1,000,000 Ω 1% 1/4W |
| R31 | 0.81 Ω 1% 1/2W |
| R32 | 1,000,000 Ω 1% 1/4W |
| C1 | 22 uF 10% 350 V |
| C2 | 22 uF 10% 350 V |
| C3 | 470 uF 10% 16 V |
| C4 | 10 nF 5% 50 V |
| C5 | 1000 pF 2% 100 V |
| C6 | 47 nF 5% 50 V |
| C7 | 10 nF 5% 50 V |
| C8 | 470 nF 5% 50 V |
| C9 | 1500 pF 400 V |
| C10 | 3300 pF 2% 100 V |
| C11 | 100 nF 400 V |
| C12 | 10 nF 400 V |
| C13 | 560 pF 5% 50 V |
| C14 | 100 nF 5% 50 V |
| C15 | 10 nF 5% 50 V |
| C16 | 22 uF 10% 16 V |
| C17 | 1000 pF 2% 100 V |
| C18 | 100 nF 5% 50 V |
| D1 | UF4002 |
| D2 | UF4002 |
| D3 | UF4002 |
| D4 | UF4002 |
| D5 | 1N4007 |
| D6 | 1N4007 |
| D7 | 1N4007 |
| D8 | 1N4007 |
| D9 | UF4002 |
| D10 | UF5408 |
| Q1 | BUZ80 |
| Q2 | BUZ80 |
| Q3 | BUZ80 |
| Q4 | BUZ80 |
| Q5 | BUZ80 |
| U1 | NW120032CP * |
| U2 | LM393 |
| U3 | TLC272 |
| F1 | 1.0 Amp fast fuse |
| T1 | NW120060C1 * |
| T2 | NW120060B1 * |
| T3 | NW120060A1 * |
| T4 | NW120060F1 * |
| T5 | NW120060G1 * |
| T6 | NW120060D1 * |
| T7 | NW120060D1 * |

*NW . . . components available from Negawatt Technologies Inc. Edmonton, Alberta, Canada. Reference numerals in this table and FIG. 14 relate only to FIG. 14.

A person skilled in the art could make immaterial modifications to the invention described and claimed in this patent without departing from the essence of the invention.

The Embodiments of the Invention in which an Exclusive Property or Privilege is Claimed are Defined as Follows:

1. An energy management control system for an installation having several zones and a power source, the system comprising:

plural zone controllers operatively connectable to the power source, each zone controller including a load side;

plural loads associated with each zone controller, each load being operatively connected via a power conductor to receive power from the load side of the zone controller;

control means associated with each zone controller to control the power used by the loads associated with the zone controller;

a modulator associated with each zone controller for modulating a control signal from the control means onto the power conductor; and a control signal detector at each load, the control signal detector connected to receive control signals from the control means appearing on the power conductor connected to the load, each load associated with a particular zone controller being connected to receive the same control signals as other loads associated with that particular zone controller.

2. The energy management control system of claim 1 further comprising a central computer operatively connected to each zone controller.

3. The energy management control system of claim 2 further comprising an HVAC system interface operatively connected to the central computer.

4. The energy management control system of claim 2 further comprising means, operatively connected to the central computer, for communicating with the central computer by remote control.

5. The energy management control system of claim 2 further comprising a security system interface operatively connected to the central computer.

6. The energy management control system of claim 2 further comprising means operatively connected to the central computer for providing a power consumption schedule to the central computer according to which the loads are to be managed.

7. A method of controlling loads distributed within distinct zones in an installation, the method comprising the steps of:

connecting loads within each distinct zone to receive both control signals and operative power from a zone controller associated with each distinct zone; and supplying the power and the control signals along the same conductors to each load through the zone controller to provide power to the loads and control operation of the respective loads.

8. The method of claim 7 further comprising the step of controlling each zone controller with a central computer.

9. The method of claim 8 further comprising controlling an HVAC system with signals sent from the central computer.

10. The method of claim 7 further comprising the steps of receiving signals at the central computer from a power utility, and controlling power supplied to the loads according to the signals received from the power utility.

11. The method of claim 7 further comprising the step of controlling the power supplied to the loads according to load schedules provided to the central computer.

12. The method of claim 7 further comprising the step of interfacing the central computer to a security system.

* * * * *